United States Patent
Zhao et al.

(10) Patent No.: US 10,623,774 B2
(45) Date of Patent: Apr. 14, 2020

(54) CONSTRAINED BLOCK-LEVEL OPTIMIZATION AND SIGNALING FOR VIDEO CODING TOOLS

(71) Applicant: QUALCOMM Incorporated, San Diego, CA (US)

(72) Inventors: Xin Zhao, San Diego, CA (US); Vadim Seregin, San Diego, CA (US); Rajan Laxman Joshi, San Diego, CA (US); Amir Said, San Diego, CA (US); Xiang Li, San Diego, CA (US); Marta Karczewicz, San Diego, CA (US); Jianle Chen, San Diego, CA (US); Wei-Jung Chien, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 15/465,122

(22) Filed: Mar. 21, 2017

(65) Prior Publication Data

US 2017/0280162 A1 Sep. 28, 2017

Related U.S. Application Data

(60) Provisional application No. 62/311,877, filed on Mar. 22, 2016.

(51) Int. Cl.
*H04N 19/46* (2014.01)
*H04N 19/61* (2014.01)
(Continued)

(52) U.S. Cl.
CPC ........... *H04N 19/61* (2014.11); *H04N 19/103* (2014.11); *H04N 19/122* (2014.11);
(Continued)

(58) Field of Classification Search
CPC .... H04N 19/124; H04N 19/13; H04N 19/147; H04N 19/176; H04N 19/184;
(Continued)

(56) References Cited

U.S. PATENT DOCUMENTS

| 4,894,713 A | 1/1990 | Delogne et al. |
| 5,136,371 A | 8/1992 | Savatier et al. |

(Continued)

FOREIGN PATENT DOCUMENTS

| CN | 1289213 A | 3/2001 |
| CN | 1662066 A | 8/2005 |

(Continued)

OTHER PUBLICATIONS

Chen et al, "Coding tools investigation for next generation video coding" Jan. 2015 (Year: 2015).*

(Continued)

*Primary Examiner* — William C Vaughn, Jr.
*Assistant Examiner* — Naod W Belai
(74) *Attorney, Agent, or Firm* — Shumaker & Sieffert, P.A.

(57) ABSTRACT

An example device for decoding encoded video data includes storage media and processing circuitry. The storage media are configured to store a portion of the encoded video data. The processing circuitry is configured to determine a block-level threshold for the portion of the encoded video data stored to the storage media, to determine that an encoded block of the portion of the encoded video data has a size that is equal to or greater than the threshold, to receive a syntax element indicating that a portion of the encoded block is to be reconstructed using a coding tool, to determine, based on the encoded block having the size that is equal to or greater than the threshold, that the syntax element applies to all samples of a plurality of samples included in the encoded (Continued)

block, and to reconstruct the encoded block based on the coding tool.

30 Claims, 9 Drawing Sheets

(51) Int. Cl.
*H04N 19/103* (2014.01)
*H04N 19/134* (2014.01)
*H04N 19/122* (2014.01)
*H04N 19/159* (2014.01)
*H04N 19/176* (2014.01)
*H04N 19/70* (2014.01)
*H04N 19/119* (2014.01)
*H04N 19/184* (2014.01)
*H04N 19/96* (2014.01)

(52) U.S. Cl.
CPC ......... *H04N 19/134* (2014.11); *H04N 19/159* (2014.11); *H04N 19/176* (2014.11); *H04N 19/46* (2014.11); *H04N 19/70* (2014.11); *H04N 19/119* (2014.11); *H04N 19/184* (2014.11); *H04N 19/96* (2014.11)

(58) Field of Classification Search
CPC .... H04N 19/186; H04N 19/30; H04N 19/463; H04N 19/597; H04N 19/91
USPC .................................................. 375/240.12
See application file for complete search history.

(56) References Cited

U.S. PATENT DOCUMENTS

| | | | |
|---|---|---|---|
| 5,629,779 A | 5/1997 | Jeon | |
| 5,684,536 A | 11/1997 | Sugiyama et al. | |
| 5,721,822 A | 2/1998 | Agarwal | |
| 5,767,909 A | 6/1998 | Jung | |
| 5,768,434 A | 6/1998 | Ran | |
| 5,815,601 A | 9/1998 | Katata et al. | |
| 5,974,181 A | 10/1999 | Prieto | |
| 5,995,055 A | 11/1999 | Milroy | |
| 6,115,071 A | 9/2000 | Hurst, Jr. et al. | |
| 6,157,676 A | 12/2000 | Takaoka et al. | |
| 6,345,121 B1 | 2/2002 | Matsumoto | |
| 6,476,805 B1 | 11/2002 | Shum et al. | |
| 6,654,503 B1 | 11/2003 | Sudharsanan et al. | |
| 6,674,910 B1 | 1/2004 | Moon et al. | |
| 6,724,818 B1 | 4/2004 | Frojdh et al. | |
| 6,795,584 B2 | 9/2004 | Karczewicz et al. | |
| 6,917,711 B1 | 7/2005 | Wang et al. | |
| 7,142,231 B2 | 11/2006 | Chipchase et al. | |
| 7,145,948 B2 | 12/2006 | Ye et al. | |
| 7,170,937 B2 | 1/2007 | Zhou | |
| 7,190,840 B2 | 3/2007 | Said | |
| 7,215,707 B2 | 5/2007 | Lee et al. | |
| 7,233,623 B1 | 6/2007 | Pau et al. | |
| 7,263,232 B2 | 8/2007 | Srinivasan | |
| 7,266,149 B2 | 9/2007 | Holcomb et al. | |
| 7,289,674 B2 | 10/2007 | Karczewicz | |
| 7,379,501 B2 | 5/2008 | Lainema | |
| 7,379,608 B2 | 5/2008 | Marpe et al. | |
| 7,529,484 B2 | 5/2009 | Xu et al. | |
| 7,664,184 B2 | 2/2010 | Reznic et al. | |
| 7,702,013 B2 | 4/2010 | Schwarz et al. | |
| 7,706,443 B2 | 4/2010 | Chandramouly et al. | |
| 7,751,476 B2 | 7/2010 | Tanizawa et al. | |
| 7,751,478 B2 | 7/2010 | Kim et al. | |
| 7,751,479 B2 | 7/2010 | Paniconi et al. | |
| 7,782,954 B2 | 8/2010 | Liang et al. | |
| 7,792,390 B2 | 9/2010 | Prakash et al. | |
| 7,847,861 B2 | 12/2010 | Zhai et al. | |
| 7,925,107 B2 | 4/2011 | Kim et al. | |
| 7,933,337 B2 | 4/2011 | Srinivasan et al. | |
| 7,944,965 B2 | 5/2011 | Bhaskaran et al. | |
| 7,970,058 B2 | 6/2011 | Suzuki | |
| 8,024,121 B2 | 9/2011 | Tang | |
| 8,036,264 B2 | 10/2011 | Doshi | |
| 8,135,064 B2 | 3/2012 | Tasaka et al. | |
| 8,199,819 B2 | 6/2012 | Seo et al. | |
| 8,238,428 B2 | 8/2012 | Karczewicz | |
| 8,406,299 B2 | 3/2013 | Karczewicz | |
| 8,428,133 B2 | 4/2013 | Ye et al. | |
| 8,488,668 B2 | 7/2013 | Ye et al. | |
| 8,488,672 B2 | 7/2013 | Karczewicz | |
| 8,571,104 B2 | 10/2013 | Ye et al. | |
| 8,619,853 B2 | 12/2013 | Ye et al. | |
| 8,902,984 B2 | 12/2014 | Jeon | |
| 9,077,968 B2 | 7/2015 | Sato et al. | |
| 9,172,968 B2 | 10/2015 | Karczewicz et al. | |
| 9,215,470 B2 | 12/2015 | Karczewicz et al. | |
| 2002/0055215 A1 | 5/2002 | Tamura et al. | |
| 2003/0081850 A1 | 5/2003 | Karczewicz et al. | |
| 2003/0128753 A1 | 7/2003 | Lee et al. | |
| 2003/0138150 A1 | 7/2003 | Srinivasan | |
| 2003/0146936 A1 | 8/2003 | Greer et al. | |
| 2003/0169931 A1 | 9/2003 | Lainema | |
| 2003/0206594 A1 | 11/2003 | Zhou | |
| 2003/0223493 A1 | 12/2003 | Ye et al. | |
| 2003/0231795 A1 | 12/2003 | Karczewicz | |
| 2004/0008771 A1 | 1/2004 | Karczewicz | |
| 2004/0120590 A1 | 6/2004 | Fuchs et al. | |
| 2004/0151395 A1 | 8/2004 | Kesaniemi et al. | |
| 2004/0213348 A1 | 10/2004 | Kim et al. | |
| 2005/0025236 A1 | 2/2005 | Yan et al. | |
| 2005/0036549 A1 | 2/2005 | He et al. | |
| 2005/0078754 A1 | 4/2005 | Liang et al. | |
| 2005/0123207 A1 | 6/2005 | Marpe et al. | |
| 2005/0152452 A1 | 7/2005 | Suzuki | |
| 2005/0157784 A1 | 7/2005 | Tanizawa et al. | |
| 2005/0157797 A1 | 7/2005 | Gaedke | |
| 2005/0213660 A1 | 9/2005 | Paniconi et al. | |
| 2005/0243920 A1 | 11/2005 | Murakami et al. | |
| 2005/0281334 A1 | 12/2005 | Walker et al. | |
| 2005/0281337 A1 | 12/2005 | Kobayashi et al. | |
| 2006/0104527 A1 | 5/2006 | Koto et al. | |
| 2006/0120456 A1 | 6/2006 | Tasaka et al. | |
| 2006/0146936 A1 | 7/2006 | Srinivasan | |
| 2006/0153295 A1 | 7/2006 | Wang et al. | |
| 2006/0218482 A1 | 9/2006 | Ralston et al. | |
| 2007/0002945 A1 | 1/2007 | Kim | |
| 2007/0005795 A1 | 1/2007 | Gonzalez | |
| 2007/0014348 A1 | 1/2007 | Bao et al. | |
| 2007/0025631 A1 | 2/2007 | Kim et al. | |
| 2007/0036215 A1 | 2/2007 | Pan et al. | |
| 2007/0070082 A1 | 3/2007 | Brennan | |
| 2007/0160303 A1 | 7/2007 | Guleryuz et al. | |
| 2007/0206872 A1 | 9/2007 | Song | |
| 2008/0008246 A1 | 1/2008 | Mukherjee et al. | |
| 2008/0075171 A1 | 3/2008 | Suzuki | |
| 2008/0159389 A1 | 7/2008 | Lee et al. | |
| 2008/0232463 A1 | 9/2008 | Lu et al. | |
| 2008/0260027 A1 | 10/2008 | Karczewicz | |
| 2008/0260030 A1 | 10/2008 | Karczewicz | |
| 2008/0260031 A1 | 10/2008 | Karczewicz | |
| 2008/0285644 A1 | 11/2008 | Seo et al. | |
| 2008/0310504 A1 | 12/2008 | Ye et al. | |
| 2008/0310507 A1 | 12/2008 | Ye et al. | |
| 2008/0310512 A1 | 12/2008 | Ye et al. | |
| 2008/0310745 A1 | 12/2008 | Ye et al. | |
| 2009/0052534 A1 | 2/2009 | Wang et al. | |
| 2009/0060362 A1 | 3/2009 | Harmanci et al. | |
| 2009/0123066 A1 | 5/2009 | Moriya et al. | |
| 2010/0020867 A1 | 1/2010 | Wiegand et al. | |
| 2010/0054334 A1 | 3/2010 | Yoo et al. | |
| 2010/0054615 A1 | 3/2010 | Choi et al. | |
| 2010/0118943 A1 | 5/2010 | Shiodera et al. | |
| 2010/0128995 A1 | 5/2010 | Drugeon et al. | |
| 2010/0172409 A1 | 7/2010 | Reznik et al. | |
| 2010/0208802 A1 | 8/2010 | Tsukuba et al. | |
| 2010/0284459 A1 | 11/2010 | Jeong et al. | |
| 2011/0116539 A1 | 5/2011 | He et al. | |
| 2011/0317757 A1 | 12/2011 | Coban et al. | |

(56) References Cited

U.S. PATENT DOCUMENTS

| | | |
|---|---|---|
| 2012/0008675 A1 | 1/2012 | Karczewicz et al. |
| 2012/0008682 A1 | 1/2012 | Karczewicz et al. |
| 2012/0008683 A1 | 1/2012 | Karczewicz et al. |
| 2012/0027079 A1 | 2/2012 | Ye et al. |
| 2012/0099646 A1 | 4/2012 | Coban et al. |
| 2012/0114034 A1 | 5/2012 | Huang et al. |
| 2012/0170649 A1 | 7/2012 | Chen et al. |
| 2012/0177120 A1 | 7/2012 | Guo et al. |
| 2012/0300835 A1 | 11/2012 | Karczewicz |
| 2013/0044812 A1 | 2/2013 | Ye et al. |
| 2013/0128974 A1 | 5/2013 | Chien et al. |
| 2016/0219283 A1 | 7/2016 | Chen et al. |
| 2016/0219290 A1 | 7/2016 | Zhao et al. |
| 2016/0219302 A1 | 7/2016 | Liu et al. |
| 2017/0094285 A1 | 3/2017 | Said et al. |
| 2017/0094313 A1 | 3/2017 | Zhao et al. |
| 2017/0094314 A1 | 3/2017 | Zhao et al. |

FOREIGN PATENT DOCUMENTS

| | | |
|---|---|---|
| CN | 1798341 A | 7/2006 |
| CN | 1801940 A | 7/2006 |
| CN | 101658041 A | 2/2010 |
| EP | 1370087 A1 | 12/2003 |
| EP | 1553782 A2 | 7/2005 |
| EP | 1679903 A2 | 7/2006 |
| EP | 1768415 A1 | 3/2007 |
| EP | 1876838 A1 | 1/2008 |
| EP | 2168381 A2 | 3/2010 |
| EP | 2464013 A1 | 6/2012 |
| EP | 2947884 A1 | 11/2015 |
| JP | 1155678 A | 6/1989 |
| JP | 2070127 A | 3/1990 |
| JP | 08280032 | 10/1996 |
| JP | 10271505 A | 10/1998 |
| JP | 2002135126 A | 5/2002 |
| JP | 2002232887 A | 8/2002 |
| JP | 2003250157 A | 9/2003 |
| JP | 2004007766 A | 1/2004 |
| JP | 2005176073 A | 6/2005 |
| JP | 2006191628 A | 7/2006 |
| JP | 2006295408 A | 10/2006 |
| JP | 2007053561 A | 3/2007 |
| JP | 2007074050 A | 3/2007 |
| JP | 2007189276 A | 7/2007 |
| JP | 2007267123 A | 10/2007 |
| JP | 2008022405 A | 1/2008 |
| JP | 2008154155 A | 7/2008 |
| JP | 2008193627 A | 8/2008 |
| JP | 2009513056 A | 3/2009 |
| JP | 2009118233 A | 5/2009 |
| JP | 2010525675 A | 7/2010 |
| JP | 2010530188 A | 9/2010 |
| JP | 2010530190 A | 9/2010 |
| JP | 2013531445 A | 8/2013 |
| JP | 2013534794 A | 9/2013 |
| KR | 101998003415 | 8/1998 |
| KR | 20060079087 A | 7/2006 |
| KR | 20100029838 A | 3/2010 |
| RU | 2119727 | 9/1998 |
| RU | 2127962 C1 | 3/1999 |
| RU | 2162280 C2 | 1/2001 |
| RU | 2004139081 | 7/2005 |
| RU | 2258320 C2 | 8/2005 |
| RU | 2004125588 A | 1/2006 |
| RU | 2005113308 A | 1/2006 |
| RU | 2005137246 | 6/2007 |
| RU | 2314656 C2 | 1/2008 |
| WO | WO-9421083 A1 | 9/1994 |
| WO | WO-9800807 A1 | 1/1998 |
| WO | WO-03063501 A1 | 7/2003 |
| WO | WO-2004032032 A1 | 4/2004 |
| WO | WO-2005107267 A1 | 11/2005 |
| WO | WO-2007010690 A1 | 1/2007 |
| WO | WO-07046644 | 4/2007 |
| WO | WO-2007063472 A2 | 6/2007 |
| WO | WO-2008044658 A1 | 4/2008 |
| WO | WO-2008084817 A1 | 7/2008 |
| WO | WO-2008088140 A1 | 7/2008 |
| WO | WO-2008131042 A1 | 10/2008 |
| WO | WO-2008131045 | 10/2008 |
| WO | WO-2008157360 A2 | 12/2008 |
| WO | WO-2008157431 A2 | 12/2008 |
| WO | WO-2009080133 A1 | 7/2009 |
| WO | WO-2011002504 A1 * | 1/2011 | ........... H04N 19/176 |
| WO | WO-2011031332 A1 | 3/2011 |
| WO | WO-2011163517 A1 | 12/2011 |
| WO | WO-2012006568 A1 | 1/2012 |
| WO | WO-2012006574 A2 | 1/2012 |
| WO | WO-2012102929 A1 | 8/2012 |
| WO | WO-2015192800 A1 | 12/2015 |

OTHER PUBLICATIONS

Aase S.O et al: "A critique of SVD-based image coding systems," IEEE Circuits and Systems, Orlando, FL, vol. 4, May 30, 1999-Jun. 2, 1999, pp. 13-16, XP002503942.

Advanced video coding for generic audiovisual services, ITU-T Standard Pre-Published (P), International Telecommunication Union, Geneva, CH, N. H264 3/5, Mar. 1, 2005, 125 pp., XP002448756.

Alshina E., et al., "CE7: Experimental results of ROT by Samsung," Joint Collaborative Team on Video Coding (JCT-VC) of ITU-T SG16 WP3 and ISO/IEC JTC1/SC29/WG11, 5th Meeting, Document No. JCTVC-E380, Mar. 17, 2011, 10 pp.

Alshina E., et al., "Known tools performance investigation for next generation video coding," 52nd Meeting, Jun. 19 through 26, 2015, Warsaw, Poland; ITU-Telecommunications Standarization Sector Study Group 16 Question 6 Video Coding Experts Group (VCEG), VCEG-AZ05, Jun. 18, 2015, 5 pp.

Amonou (FT) I et al.: "Description of video coding technology proposal by France Telecom, NTT, NTT DOCOMO, Panasonic and Technicolor", 1.JCT-VC Meeting: Apr. 15, 2010-Apr. 23, 2010; Dresden, DE; (Jointcollaborative Team on Video Coding of ISO/IEC JTC1/SC29/WG11 and ITU-TSG.16); URL: http://wftp3.itu.int/av-arch/jctvc-site/,, No. XP030007552, May 7, 2010 (May 7, 2010), XP030007553, ISSN: 0000-0049 p. 54-p. 61, p. 81-p. 85.

An et al., "Boundary-Dependent Transform for Inter-Predicted Residue," JCTVC-G281, PowerPoint presentation, 7th JCTVC Meeting, Geneva, CH, Nov. 21-30, 2011, 12 slides.

An et al., "Non-CE7: Boundary-Dependent Transform for Inter-Predicted Residue, JCTVCG281, JCT-VC Meeting; Joint Collaborative Team on Video Coding (JCT-VC), of ITU-T SG16 WP3 and ISO/IEC JTC1/SC29/WG11; Nov. 21-30, 2011; document No. JCTVC-G281, Nov. 22, 2011, 10 pp.".

An et al., "Non-CE7: Boundary-Dependent Transform for Inter-Predicted Residue," JCTVCG281, JCT-VC Meeting; Joint Collaborative Team on Video Coding (JCT-VC), of ITU-T SG16 WP3 and ISO/IEC JTC1/SC29/WG11; Nov. 21-30, 2011; document No. JCTVC-G281_r1, Nov. 22, 2011, 11 pp.

An J., et al., "Quadtree plus binary tree structure Integration with JEM Tools," 2. JVET Meeting, Feb. 20, 2016-Feb. 26, 2016, San Diego, CA (The Joint Video Exploration Team of ISO/IEC JTC1/SC29/WG11 and ITU-T SG.16), No. JVET-B0023-v2, Feb. 20, 2016 (Feb. 20, 2016), XP030150012. Retrieved from Internet: URL: http://phenix.int-evry.fr/jvet/<div><spanstyle="color: #111111; font-family: anal; font-size: 12px;"></div>, 10 pp.

Anonymous: "Test Model under Consideration," Joint Collaborative Team on Video Coding (JCT-VC) of ITU-T SG16 WP3 and ISO/IEC JTC1/SC29/WG11, Document: JCTVC-B205, Status: Output Document (draft000), Jul. 2010, pp. 1-153, Internet<URL:http://phenix.int-evry.fr/jct/doc_end_user/documents/20_Geneva/wg11/JCTVC-B205.zip> (1-4, 18-21, 42-47, 142).

Aubury M., et al., "Binomial Filters," Journal of VLSI Signal Processing, Kluwer Academic Publishers, Boston, Nov. 15, 1994, Revised Jul. 24, 1995, 27 pp.

Author Unknown: "Coding tools investigation for next generation video coding," ITU, Telecommunication Standardization Sector, Jan. 2015, 7 pp.

(56) References Cited

OTHER PUBLICATIONS

Bossen F., "Common test conditions and software reference configurations," Joint Collaborative Team on Video Coding (JCT-VC) of ITU-T SG16 WP3 and ISO/IEC JTC1/SC29/WG11, 12th Meeting: Geneva, CH, Jan. 14-23, 2013, JCTVC-L1100, 4 pp.
Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.
Bross B., et al., "High efficiency video coding (HEVC) text specification draft 8," 10. JCT-VC Meeting; 101. MPEG Meeting; Jul. 11, 2012-Jul. 20, 2012; Stockholm, SE (Joint Collaborative Team on Video Coding of ISO/IEC JTC1/SC29/WG11 and ITU-T SG.16); URL: http://wftp3.itu.int/av-arch/jctvc-site/,, No. JCTVC-J1003_d7, Jul. 23, 2012 (Jul. 23, 2012), XP030112947, 260 pp.
Bross et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Bross et al., "High Efficiency Video Coding (HEVC) Text Specification Draft 9," Joint Collaborative Team on Video Coding (JCT-VC) of ITU-T SG16 WP3 and ISO/IEC JTC1/SC29/WG11, JCTVC-K1003_v7, 11th Meeting: Shanghai, CN, Oct. 10-19, 2012 , 290 pp.
Bross et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.
Bross et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, CH (Nov. 2011), 214 pages.
Business Communication: "Business Communication," Kabushiki Kaisha Business Communication Sha, vol. 44, No. 6, Jun. 1, 2007, p. 92, ISSN: 0385-695X.
Chen et al., "Preliminary version of High efficiency video coding (HEVC) scalable extension Draft 6," Joint Collaborative Team on Video Coding (JCT-VC) of ITU-T SG 16 WP 3 and ISO/IEC JTC 1, Document: JCTVC-Q1008v2, Mar. 27-Apr. 4, 2014, 160 pp.
Chen J., et al., "Algorithm Description of Joint Exploration Test Model 1," 1, JVET Meeting; Oct. 19, 2015-Oct. 21, 2015; Geneva, CH (The Joint Video Exploration Team of ISO/IEC JTC1/SC29/WG11 and ITU-T SG.16 ); URL: http://phenix.int-evry.fr/jvet/,, No. JVET-A1001, Feb. 24, 2016 (Feb. 24, 2016), XP030150000, 27 pp.
Chen J., et al., "Coding tools investigation for next generation video coding, C 806," ITU-T Draft, Study Period 2013-2016, International Telecommunication Union, Geneva, CH, vol. 6/16, Jan. 27, 2015 (Jan. 27, 2015), XP044083237, pp. 1-7. [Retrieved on Jan. 27, 2015].
Chen J., et al., "Further Improvements to HMKTA-1.0," 52. VCEG meeting, Jun. 19, 2015-Jun. 26, 2015, Warsaw, PL (Video Coding Experts Group of ITU-T SG.16), No. VCEG-AZ07, Jun. 19, 2015 (Jun. 19, 2015), XP030003885, the whole document, 8 pp.t.
Conklin et al.: "New Intra Prediction Modes," ITU-Telecommunications Standardization Sector, Study Group 16, Question 6, Video Coding Experts Group (VCEG), Document No. VCEG-N54, pp. 1-10, XP0300003304, 14th Meeting: Santa Barbara, Sep. 24-27, 2001.
Davies T., et al., "Suggestion for a Test Model," 1. JCT-VC Meeting, Apr. 15, 2010-Apr. 23, 2010, Dresden, DE (Jointcollaborative Team on Video Coding of ISO/IEC JTCI/SC29/WGII and ITU-TSG.16),XP030007526, pp. 1-30, May 7, 2010 (May 7, 2010).
Dong et al, "Introduction to Test Model under Consideration (TmuC)" (Jun. 27, 2010), 3 pp.
Draft ISO/IEC 14496-10: 2002(E) Section 9.1.5.1; "Text of Final Committee Draft of Joint Video Specification (ITU-T Rec, H.264, ISO/IEC 14496-10 AVC)," International Organisation for Standardisation Organisation Internatonale de Normalisation, ISO/IEC JTC1/SC29/WG11 Coding of Moving Pictures and Audio, MPEG02/N4920, p. 83 with figure 9-1, Editor Thomas Wiegand, Klagenfurt, AT, Jul. 2002, 207 pp.
Fu et al., "A Comparative Study of Compensation Techniques in Directional DCT's," IEEE International Symposium on Circuits and Systems (ISCAS) 2007, pp. 521-524, May 27-30, 2007.
Fu et al, "Diagonal Discrete Cosine Transforms for Image Coding," (Nov. 2, 2006), Advances in Multimedia Information Processing—Proceedings of the 7th Pacific Rim Conference on Multimedia, PCM 2006, Huangzhou, China, Nov. 2-4, 2006 Lecture Notes in Computer Science;LNCS, Springer, Berlin, DE, pp. 150-158, XP019047687, ISBN: 978-3-540-48766-1.
Han J., et al., "Towards jointly optimal spatial prediction and adaptive transform in video/image coding," IEEE International Conference on Acoustics, Speech and Signal Processing (ICASSP), pp. 726-729 (Mar. 2010).
Han W.J., et al., "Improved Video Compression Efficiency Through Flexible Unit Representation and Corresponding Extension of Coding Tools," IEEE Transactions on Circuits and Systems for Video Technology, vol. 20, No. 12, Dec. 2010, pp. 1709-1720.
Iain. Richardson: Video Coding H.264 i MPEG-4—New Generation Standards, Moscow, Tekhnosfera, 2005, translation of 2003 publication, pp. 145-183, 233-240, 198 pp.
International Search Report and Written Opinion—PCT/US2017/023577—ISA/EPO—dated May 31, 2017, 25 pp.
ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.
ITU-T H.261, Line Transmission of Non-Telephone Signals, Video Codec for Audiovisual Services at p × 64 kbits, The International Telecommunication Union, Mar. 1990, 32 pp.
ITU-T H.262 (Feb. 2000), "Information Technology—Generic coding of moving pictures and associated audio information: Video," Series H: Audiovisual and Multimedia Systems, Infrastructure of Audiovisual Services—Coding of Moving Video, Feb. 2000, 220 pages.
ITU-T H.263, "Video coding for low bit rate communication," Series H: Audiovisual and Multimedia Systems, Infrastructure of audiovisual services—Coding of moving video, Jan. 2005, 226 pages.
ITU-T H.264, Series H: Audiovisual and Multimedia Systems, Infrastructure of audiovisual services—Coding of moving video, Advanced video coding for generic audiovisual services, Mar. 2005, 24 pp.
ITU-T H.265, "Series H: Audiovisual and Multimedia Systems, Infrastructure of Audiovisual Services—Coding of moving video : High efficiency video coding," The International Telecommunication Union, Apr. 2013, 317 pp.
ITU-T H.265, Series H: Audiovisual and Multimedia Systems, Infrastructure of audiovisual services—Coding of moving Video, Advanced video coding for generic audiovisual services, The International Telecommunication Union. Apr. 2015, 634 pp.
Zhao X., et al., "Rate-distortion optimized transform for intra-frame coding," Acoustics Speech and Signal Processing (ICASSP) , 2010 IEEE International Conference on, IEEE, Piscataway, NJ, USA, Mar. 14, 2010 (Mar. 14, 2010), pp. 1414-1417, XP031743031, ISBN: 978-1-4244-4295-9 the whole document.
Zhao X., et al., "TU-level non-separable secondary transform," 2, JVET Meeting; Feb. 20, 2016-Feb. 26, 2016; San Diego; (The Joint Video Exploration Team of ISO/IEC JTC1/SC29/WG11 and ITU-T SG.16 ); URL: http://phenix.int-evry.fr/jvet/,, No. JVET-B0059 Feb. 17, 2016 (Feb. 17, 2016), XP030150066, 5 pages.
Zheng Y., et al., "CE11: Mode Dependent Coefficient Scanning," 4. JCT-VC Meeting; 95. MPEG Meeting; Jan. 20, 2011-Jan. 28, 2011; Daegu, KR (Joint Collaborative Team on Video Coding of ISO/IEC JTC1/SC29/WG11and ITU-T SG.16); No. JCTVC-D393, Jan. 16, 2011, pp. 1-4, XP030008432, ISSN: 0000-0013, URL: http://wftp3.itu.int/av-arch/jctvc-site.

(56) References Cited

OTHER PUBLICATIONS

Zou F., et al., "Rate-Distortion Optimized Transforms Based on the Lloyd-Type Algorithm for Intra Block Coding," IEEE Journal of Selected Topics in Signal Processing, Dec. 2013, vol. 7, Issue 6, pp. 1072-1083.

ITU-T H.265, Series H: Audiovisual and Multimedia Systems, Infrastructure of audiovisual services—Coding of moving video, High efficiency video coding, The International Telecommunication Union, Oct. 2014, 540 pp.

ITU-T Telecommunication Standardization Sector of ITU: H.264 Series H: Audiovisual and Multimedia Systems, Infrastructure of audiovisual services—Coding of moving video—Advanced video coding for generic audiovisual services—May 2003, 24 pp.

Jain A.K., "A Sinusoidal Family of Unitary Transforms," IEEE Transactions on Pattern Analysis and Machine Intelligence, Oct. 1, 1979, pp. 356-365, IEEE Service Center, XP011242370, ISSN: 0162-8828.

Bross et al., "High Efficiency Video Coding (HEVC) text specification draft 10" (for FDIS & Last Call), Geneva, CH, JCTVC-L1003_v34, Jan. 14-23, 2013, 310 pp.

Kim et al., "Complexity Reduction Algorithm for Intra Mode Selection in H.264/AVC Video Coding," Advanced Concepts for Intelligent Vision Systems, Lecture Notes in Computer Science, Springer Berlin/Heidelberg, vol. 4179/2006, Oct. 4, 2006, pp. 454-465.

Joshi, R., et al., "CE7: Mode Dependent Intra Residual Coding," 5th Meeting, Mar. 16-23, 2011, Document: JCTVC-E098, 9 pp.

Karczewicz M., et al., "Video coding technology proposal by Qualcomm," 1. JCT-VC Meeting; Apr. 15, 2010-Apr. 23, 2010; Dresden. DE (Joint Collaborative Team on Video Coding of ISO/IEC JTC1/SC29/WG11 and ITU-TSG.16); URL: http://wftp3.itu.int/av-arch/jctvc-site/, No. XP030007566, May 18, 2010 (May 18, 2010), pp. 1-24, XP030007567, ISSN: 0000-0049 p. 1, p. 12-p. 13.

Karczewicz M., et al., "Study of coding efficiency improvements beyond HEVC," 113. MPEG Meeting; Oct. 19, 2015-Oct. 23, 2015; Geneva, CH (Motion Picture Expert Group or ISO/IEC JTC1/SC29/WG11),, No. M37102, Oct. 15, 2015 (Oct. 15, 2015), XP030065470, whole document, 13 pp.

Korean Patent Abstracts, Jeong, Je-Chang and Kim, Dong-Hyung, "Apparatus and method for fast mode selection," XP002660082 abstract & KR100865690 B1 (IUCF HYU [KR]) Oct. 28, 2008 (Oct. 28, 2008), 1 p.

Lainema. J et al., "Intra Coding of the HEVC Standard," IEEE Transactions on Circuits and Systems for Video Technology, vol. 22, No. 12, Dec. 2012, pp. 1792-1801.

Lee et al., "Adaptive Scanning for H.264/AVC Intra Coding," ETRI Journal, vol. 28, No. 5, pp. 668-671, Oct. 2006.

Lee S., et.al., "High-Efficiency Video Compression Framework Based on Flexible Unit Representation," Proceedings of the Second APSIPA Annual Summit and Conference, Dec. 17, 2010, pp. 623-631, [online], URL : http://www.apsipa.org/proceedings_2010/pdf/APSIPA124.pdf.

Li et al., "Prediction Based Adaptive Transform Coefficients Scanning for Inter-Frame Video Coding," pp. 4205-4208 (2010).

Lim S-C., et al., "Rate-distortion optimized adaptive transform coding," Optical Engineering, Aug. 2009, vol. 48, No. 8, pp. 087004-1-087004-14.

Marpe D., et al., "Context-Based Adaptive Binary Arithmetic Coding in the H.264/AVC Video Compression Standard," IEEE Transactions on Circuits and Systems for Video Technology, IEEE Service Center, pp. 620-636, XP011099255, vol. 13 (7), Jul. 2003.

Marpe D., et al., "Transform Coding Using the Residual Quadtree (RQT)," Fraunhofer Heinrich Hertz Institute, 4 pp. URL: http://www.hhi.fraunhofer.de/fields-of-competence/image-processing/researchgroups/ image-video-coding/hevc-high-efficiency-video-coding/transform-coding-using-the-residual-quadtree-rqt.html ; [ Retrieved on Feb. 9, 2017].

Karczewicz, "Improved Intra Coding," ITU—Telecommunications Standardization Sector Study Group 16 Question 6 Video Coding Experts Group (VCEG), VCEG-AF15, 32 Meeting: San Jose, USA, Apr. 20-21, 2007, 4 pp.

Martucci S.A., et al., "Symmetric Convolution and the Discrete Sine and Cosine Transforms," IEEE Transactions on Signal Processing, vol. 42, No. 5, May 1, 1994, pp. 1038-1051, IEEE Signal Processing Society, XP000863873.

Mccann K., et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.

Mediatek Inc: "Block partitioning structure for next generation video coding," ITU-T SG16 Meeting, Oct. 12, 2015-Oct. 23, 2015, Geneva, CH, No. T13-SG16-C-0966, Sep. 28, 2015 (Sep. 28, 2015), XP030100738, pp. 8.

Mrak, M. et al., "A context modeling algorithm and its application in video compression," Proceedings International Conference on Image Processing (ICIP), Sep. 14, 2003, pp. 845-848, vol. 3, IEEE, XP010669966, ISBN: 978-0-7803-7750-9.

Pan et al., "Fast Mode Decision Algorithm for Intraprediction in H.264/AVC Video Coding," IEEE Transactions on Circuits and Systems for Video Technology, vol. 15, No. 7, Jul. 2005, pp. 1709-1720pp. 813-822 (2005).

QUALCOMM: "Mode-dependent non-separable secondary transform," ITU-T SG16 Meeting, Oct. 12, 2015-Oct. 23, 2015, Geneva, CH, No. T13-SG16-C-1 044, Sep. 30, 2015 (Sep. 30, 2015), XP030100752, 5 pp.

QUALCOMM: "Position dependent intra prediction combination," ITU-T SG16 Meeting, Oct. 12, 2015-Oct. 23, 2015, Geneva, CH, No. T13-SG16-C-1 046, Sep. 30, 2015 (Sep. 30, 2015), XP030100754, 5 pp.

Kurceren et al., "Improvements on CABAC," ITU—Telecommunications Standardization Sector Study Group 16 Question 6 Video Coding Experts Group (VCEG), VCEG-024, 15th Meeting: Pattaya, Thailand, Dec. 4-6, 2001, 4 pp.

Richardson I E G: "H264/MPEG-4 Part 10 White Paper—Prediction of Intra Macroblocks" Internet Citation, [Online] XP02281494, Apr. 2003, Retrieved from the Internet: URL: http://www.vcodex.com/h264.html.h264_intrapred.pdf [retrieved on May 24, 2004], 6 pp.

Robert et al., "Improving Intra mode coding in H.264/AVC through block oriented transforms," 2006 IEEE 8th Workshop on Multimedia Signal Processing, pp. 382-386. Oct. 3-6, 2006.

Said A., et al., "Position Dependent Intra Prediction combination," Qualcomm Incorporated, International Organisation for Standardisation Organisation Internationale De Normalisation ISO/IEC JTC1/SC29/WG11 Coding of Moving Pictures and Audio, ISO/IEC JTC1/SC29/WG11 MPEG2015/M37502, Geneva, CH, Oct. 2015, 4 pp.

Said Amir, "Introduction to Arithmetic Coding—Theory and Practice," Technical Report, Apr. 21, 2004, pp. 1-64, Retrieved from the Internet: URL: http://www.hpl.hp.com/techreports/2004/HPL-2004-76.pdf, 67 pp.

Saito S., et al., "HD-SDI H.264 Very low delay encoder/decoder device 'EHH-1000E/D' and its application," Image Information Industrial, Feb. 2009, Issue vol. 41, No. 2, Sangyo Kaihatsukiko Inc., Feb. 1, 2009, pp. 15-20.

Saxena A., et al., "DCT/DST-Based Transform Coding for Intra Prediction in Image/Video Coding," IEEE Transactions on Image Processing, Oct. 2013, vol. 22, Issue 10, pp. 3974-3981.

Saxena et al., "Jointly optimal intra prediction and adaptive primary transform," 3. JCT-VC Meeting; 94. Mpeg Meeting; Oct. 7, 2010-Oct. 15, 2010; Guangzhou, CN (Joint Collaborative Team on Video Coding of ISO /IECJTC1/SC29/WG11 and ITU-T 56.16); URL: http://wftp3.itu.int/av-arch/jctvc-site/, No. JCTVC-C108, Oct. 2, 2010 (2010-18-82), XP030007815, ISSN: 0000-0045, 21 pp.

Sekiguchi et al.: "Results of CE on separate prediction modes for 4:4:4 coding (CE9)," Joint Video Team (JVT) of ISO/IEC MPEG & ITU-T VCEG, (ISO/IEC JTC1/SC29/WG11 and ITU-T SG16 Q.6), Document No. JVT-R031, pp. 1-28, 18th Meeting: Bangkok, TH, Source: Mitsubishi Electric Corporation, Jan. 14-20, 2006.

(56) References Cited

OTHER PUBLICATIONS

Seregin V., et al., "Low-complexity adaptive coefficients scanning," 94. MPEG Meeting; Oct. 11, 2010-Oct. 15, 2010; Guangzhou, CN (Motion Picture Expert Group OR ISO/IEC JTC1/SC29/WG11), No. m18243, Oct. 28, 2010 (Oct. 28, 2010), XP030046833, 4 pp.
Sezer et al., "Robust Learning of 2-D Separable Transforms for Next-Generation Video Coding," Mitsubishi Electric Research Laboratories, Inc., Cambridge, MA, Mar. 2011, 12 pp.
Shiodera et al., "Bidirectional Intra Prediction," ITU-T Q.6/SG16 VCEG, VCEG-AE14, Marrakech, Morocco, Jan. 2007, 6 pp.
Sohn Y., et al., "One Dimensional Transform for H.264 Based Intra Coding (Abstract)," 26. Picture Coding Symposium; Nov. 7, 2007-Nov. 9, 2007; Lisbon, PT, 4 pp., XP030080458, Nov. 7, 2007 (Nov. 7, 2007).
Sridhar Srinivasan, "An introduction to the HD Photo Technical Design," MPEG document No. wg1n4187, pp. 1-27, Apr. 2007.
Sullivan G.J., et al., "Overview of the High Efficiency Video Coding (HEVC) Standard," IEEE Transactions on Circuits and Systems for Video Technology, IEEE Service Center, Piscataway, NJ, US, vol. 22, No. 12, Dec. 1, 2012 (Dec. 1, 2012), pp. 1649-1668, XP011487803, ISSN: 1051-8215, DOI:10.1109/TCSVT.2012.2221191.
Suzuki et al., "Description of video coding technology proposal by Sony," Joint Collaborative Team on Video Coding (JCT-VC) of ITU-T SG16 WP3 and ISO/IEC JTC1/SC29/WG11, Document JCTVC-A103, 1st Meeting: Dresden, DE, Apr. 15-23, 2010, 51 pp.
Suzuki Y., "Recent Trend of MPEG-4 Visual," Technical Report of the Information Processing Society of Japan (IPSJ), vol. 2004, No. 25 (2004-AVM-44), IPSJ, Mar. 5, 2004, pp. 85-90, ISSN: 0919-6072, 9 pp.
Shiodera et al., "Simulation results of Bidirectional Intra Prediction on KTA software version 13," ITU-T Q6/SG16 VCEG, VCEG-AF06, San Jose, CA, USA, pp. 1-4, Apr. 2007.
Tan et al.: "Spatially Compensated Block-Based Transform," Proceedings of the Seventh IASTED International Conference Signal and Image Processing, pp. 92-97, XP008097050, Aug. 15, 2005.
Tech G., et al., "MV-HEVC Draft Text 3," Joint Collaborative Team on 3D Video Coding Extension Development of ITU-T SG 16 WP 3 and ISO/IEC JTC 1/SC 29/WG 11, 3rd Meeting: Jan. 17-23, 2013, Geneva, CH, JCT3V-C1004_d3, XP002727084, 38 pp.
Tech G., et al., "MV-HEVC Draft Text 8," 8. JCT-3V Meeting; Mar. 29, 2014-Apr. 4, 2014; Valencia; (The Joint Collaborative Team on 3D Video Coding Extension Development of ISO/IEC JTC1/SC29/WG11 and ITU-T SG.16 ); URL: http://phenix.int-evry.fr/jct3v/, No. JCT3V-H1002-v5, Jun. 3, 2014, XP030132292, 163 pp.
"Text of ISO/IEC 14496-10 FCD Advanced Video Coding" Video Standards and Drafts, various authors, No. N4920, Aug. 11, 2002 (Aug. 11, 2002), XP030012343, Section 9.1.5.1, p. 83 with figure 9-1, 207 pp.
V.I. Pershikov, V.M. Savinkov, "Tolkovy Slovar po Informatike" (The Explanatory Dictionary of Informatics), Moscow, Finances and Statistics Publishing House, 1995, p. 425.
Wang et al., "A Fast Transform Domain Based Algorithm for H.264/AVC Intra Prediction," 2007 IEEE International Conference on Multimedia and Expo, Beijing, CN, Jul. 2-5, 2007, pp. 1563-1566.
Wang Y-K. et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.
Wiegand et al.: "Working Draft Number 2, Revision 4 (WD-2 rev 4) Draft ISO/IEC 14496-10: 2002(E)," Joint Video Team (JVT) of ISO/IEC MPEG and ITU-T VCEG, Document No. JVT-B118r4, pp. 1-130, Geneva, Switzerland, Jan. 29-Feb. 1, 2002.
Wiegand, T., et al., "WD2: Working Draft 2 of High-Efficiency Video Coding," Jan. 28, 2011, No. JCTVC-D503, Jan. 28, 2011 (Jan. 28, 2011), XP002679642, Retrieved from the Internet: URL: http://wftp3.itu.int/av-arch/jctvc-site/2011_01_D_Daegu/ [retrieved on Jul. 11, 2012], 153 pp.

Wiegand, T., et al., "WD3: Working Draft 3 of High-Efficiency Video Coding," Document JCTVC-E603, 5th Meeting: Geneva, CH, Mar. 16-23, 2011, 193 pages.
Wiegand T., et al.,"WD1: Working Draft 1 of High-Efficiency Video Coding," JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pp.
Wiegand, "Text of Committee Draft of Joint Video Specification," Joint Video Team (JVT) of ISO/IEC MPEG and ITU-T VCEG, JVT-C167, 3rd Meeting: Fairfax, Virginia, USA, May 6-10, 2002, 141 pp.
Wien M., "High Efficiency Video Coding," Coding Tools and specification, Preface and Contents, 2015, 22 pp.
Witten I.A., et al., "Arithmetic Coding for Data Compression," Communications of the ACM, vol. 30, No. 6, pp. 520-540 (1987).
Fan et al., "A novel coefficient scanning scheme for directional spatial prediction-based image compression," Multimedia and EXPO, 2003. Proceedings. 2003 International Conference on Jul. 6-9, 2003, Piscataway, NJ, vol. 2, pp. 557-560, XP010650616.
Xu et al.: "Lifting-Based Directional DCT-Like Transform for Image Coding," IEEE International Conference on Image Processing (ICIP) 2007, vol. 3, pp. III-185-III-188.
Xu J., et al., "An Overview of Directional Transforms in Image Coding," Circuits and Systems (ISCAS), Proceedings of 2010 IEEE International Symposium on, May 30, 2010-Jun. 2, 2010, pp. 3036-3039.
Ye et al., "Complexity Analysis of Improved Intra Coding," ITU—Telecommunications Standardization Sector Study Group 16 Question 6 Video Coding Experts Group (VCEG), 34th Meeting: Antalya, Turkey, Jan. 2008, VCEG-AH20, pp. 1-6.
Ye et al., "Improved Intra Coding," ITU-T Q.6/SG16 VCEG, C257, Geneva, Switzerland, Jun. 2007, 4 pages.
Ye Y., et al., "Improved H.264 Intra Coding Based on Bi-Directional Intra Prediction, Directional Transform, and Adaptive Coefficient Scanning," 15th IEEE International Conference on Image Processing, 2008. ICIP 2008, Oct. 2008, pp. 2116-2119.
Ye Y. et al., "Improved Intra Coding," 33. VCEG Meeting; 82. MPEG Meeting; Oct. 20, 2007-Oct. 20, 2007; Shenzhen, CN (Video Coding Experts Group of ITU-T SG.16), No. VCEG-AG11, Oct. 20, 2007, 6 pp., XP030003615, ISSN: 0000-0095.
Yeo C., et al., "Mode-Dependent Transforms for Coding Directional Intra Prediction Residuals," IEEE Transactions on Circuits and Systems for Video Technology, Apr. 2012, vol. 22, No. 4, pp. 545-554.
Yeo C., et.al., "Choice of Transforms in MDDT for Unified Intra Prediction," [online], Joint Collaborative Team on Video Coding (JCT-VC) of ITU-T SG16 WP3 and JTC1/SC29/WG11, Oct. 2, 2010, Document: JCTVC-C039 (version 1), URL : http://phenix.it-sudparis.eu/jct/doc_end_user/documents/3_Guangzhou/wg11/JCTVC-C039-m18060-v1-JCTVC-C039.zip, 4 pp.
Yeo C., et.al., "Mode-Dependent Fast Separable KLT for Block-based Intra Coding," [online] Joint Collaborative Team on Video Coding (JCT-VC) of ITU-T SG16 WP3 and ISO/IEC JTC1/SC29/WG11, Jul. 28, 2010, Document: JCTVC-B024, URL : http://phenix.it-sudparis.eu/jct/doc_end_user/documents/2_Geneva/wg11/JCTVC-B024.zip.
Yeo et al., "TE7: Results for Mode-Dependent Fast Separable KLT for Block-based Intra Coding," Joint Collaborative Team on Video Coding (JCT-VC), of ITU-T SG16 WP3 and ISO/IEC TC1/SC29/WG11, 3rd Meeting: Guangzhou, CN, Oct. 7-15, 2010, Document: JCTVC-C037, 4 pp.
Yeo et al., "Mode-Dependent Transforms for Coding Directional Intra Prediction Residuals," IEEE Transactions on circuits and Systems for Video Technology, vol. 22, No. 4, Apr. 2012, pp. 545-554.
Yu et al.: "Low complexity intra prediction," ITU—Telecommunications Standardization Sector, Study Group 16, Question 6, Video Coding Experts Group (VCEG), Document No. VCEG-Z14r1, pp. 1-4, 26th Meeting: Busan, KR, Apr. 16-22, 2005.
Yu et al., "Low-complexity intra prediction," Video Standards and Drafts, No. VCEG-Z14r1, Apr. 18, 2005 (Apr. 18, 2005), XP030003459, 4 pp.

(56) References Cited

OTHER PUBLICATIONS

Zeng et al., "Directional Discrete Cosine Transforms for Image Coding," IEEE International Conference on Multimedia and Expo (ICME 2006), Jul. 1, 2006, pp. 721-724, IEEE, XP031032937, ISBN: 978-1-4244-0366-0.

Zhang et al., "Enhanced Intra Prediction and Transform for Video Coding," 2010 17th IEEE International Conference on Image Processing (ICIP 2010), Hong Kong, Sep. 26-29, 2010, IEEE, Sep. 26, 2010 (Sep. 26, 2010), pp. 3381-3384, XP031814166, ISBN: 978-1-4244-7992-4, 4 pp.

Zhang, P., et al., "Multiple Modes Intra-Prediction in Intra Coding," Multimedia and Expo, 2004. ICME '04.2004 IEEE International Conference on Taipei, Taiwan Jun. 27-30, 2004, Piscataway, NJ, USA, IEEE,vol. 1, Jun. 27, 2004, pp. 419-422.

Zhao X., et al., "EE2.7 related: Improved non-separable secondary transform," 3, JVET Meeting; May 26, 2016-Jun. 1, 2016; Geneva, CH (The Joint Video Exploration Team of ISO/IEC JTC1/SC29/WG11 and ITU-T SG.16 ); URL: http://phenix.int-evry.frovet/,, No. JVET-00063, XP030150165, 3 pp.

Zhao X., et al., "EE2.7: TU-level non-separable secondary transform," 3, JVET Meeting; May 26, 2016-Jun. 1, 2016; Geneva, CH (The Joint Video Exploration Team of ISO/IEC JTC1/SC29/WG11 and ITU-T SG.16 ); URL: http://phenix.int-evry.fr/jvet/,, No. JVET-C0053, XP030150151, 10 pp.

Zhao X., et al., "Grouped signaling for transform in QTBT," 3.JVET Meeting, May 26, 2016-Jun. 1, 2016, Geneva, CH (The Joint Video Exploration Team of ISO/IEC JTC1/SC29/WG11 and ITU-T SG.16), No. JVET-C0054, May 17, 2016 (May 17, 2016), XP030150152. The whole document. Retrieved from Internet: URL: http://phenix.int.evry.fr/jvet/, 3 pp.

Zhao X., et al., "Video Coding with Rate-Distortion Optimizer Transform," IEEE Transactions on Circuits and Systems for Video Technology, vol. 22, No. 1, Jan. 2012, pp. 138-151.

Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.

ITU-T H.264, Series H: Audiovisual and Multimedia Systems, Infrastructure of audiovisual services—Coding of moving video, Advanced video coding for generic audiovisual services, Mar. 2005, 343 pp.

Response to Written Opinion dated May 31, 2017, from International Application No. PCT/US2017/023577, filed on Jan. 22, 2018, 22 pp.

Second Written Opinion from International Application No. PCT/US2017/023577, dated Feb. 8, 2018, 7 pp.

\* cited by examiner

CONSTRAINED BLOCK-LEVEL OPTIMIZATION AND SIGNALING FOR VIDEO CODING TOOLS

This application claims the benefit of U.S. Provisional Patent Application 62/311,877, filed 22 Mar. 2016, the entire content of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques. Video coding standards include ITU-T H.261, ISO/IEC MPEG-1 Visual, ITU-T H.262 or ISO/IEC MPEG-2 Visual ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a new video coding standard, namely High Efficiency Video Coding (HEVC), has recently been developed by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is available from http://phenix.int-evry.fr/jct/doc_end_user/documents/14_Vienna/wg11/JCTVC-N1003-v1.zip.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Pictures may be referred to as frames, and reference pictures may be referred to as reference frames.

Spatial or temporal prediction results in a predictive block for a block to be coded. Residual data represents pixel differences between the original block to be coded and the predictive block. For further compression, the residual data may be transformed from the pixel domain to a transform domain, resulting in residual transform coefficients, which then may be quantized. Entropy coding may be applied to achieve even more compression.

SUMMARY

In general, this disclosure describes techniques for using block-level thresholding or block-level constraints for the use of one or more coding tools in video encoding and video decoding.

In one example, a device for decoding encoded video data includes one or more storage media, and processing circuitry in communication with the storage media. The storage media are configured to store at least a portion of the encoded video data. The processing circuitry is configured to determine a block-level threshold for the portion of the encoded video data stored to the storage media, to determine that an encoded block of the portion of the encoded video data stored to the storage media has a size that is equal to or greater than the block-level threshold, to receive a syntax element indicating that a portion of the encoded block is to be reconstructed using a coding tool, to determine, based on the encoded block having the size that is equal to or greater than the block-level threshold, that the syntax element applies to all samples of a plurality of samples included in the encoded block, and to reconstruct the encoded block based on the coding tool.

In another example, a device for encoding video data includes one or more storage media, and processing circuitry in communication with the storage media. The storage media are configured to store at least a portion of the encoded video data. The processing circuitry is configured to determine a block-level threshold for the portion of the video data stored to the storage media, to determine that a block of the portion of the video data stored to the storage media has a size that is equal to or greater than the block-level threshold, to encode the block using a coding tool to form an encoded block, and to encode, based on the encoded block having the size that is equal to or greater than the block-level threshold, a syntax element indicating that all samples of a plurality of samples of the encoded block is to be reconstructed using the coding tool.

In another example, this disclosure is directed to a method of decoding encoded video data. The method includes determining a block-level threshold for a portion of the encoded video data, determining that an encoded block of the portion of the encoded video data has a size that is equal to or greater than the block-level threshold, receiving a syntax element indicating that a portion of the encoded block is to be reconstructed using a coding tool. The method further includes determining, based on the encoded block having the size that is equal to or greater than the block-level threshold, that the syntax element applies to all samples of a plurality of samples included in the encoded block, and reconstructing the encoded block based on the coding tool.

In another example, this disclosure is directed to an apparatus for decoding encoded video data. The apparatus includes means for determining a block-level threshold for a portion of the encoded video data, and means for determining that an encoded block of the portion of the encoded video data stored to the storage media has a size that is equal to or greater than the block-level threshold. The apparatus further includes means for receiving a syntax element indicating that a portion of the encoded block is to be reconstructed using a coding tool, and means for means for determining, based on the encoded block having the size that is equal to or greater than the block-level threshold, that the syntax element applies to all samples of a plurality of samples included in the encoded block. The apparatus further includes means for reconstructing the encoded block based on the coding tool.

The details of one or more examples are set forth in the accompanying drawings and the description below. Other features, objects, and advantages will be apparent from the description and drawings, and from the claims.

DETAILED DESCRIPTION

This disclosure is generally related to techniques for constrained block-level optimization and signaling for video coding tools. Aspects of this disclosure may also be used in the context of advanced video codecs, such as extensions of HEVC or the next generation of video coding standards. Aspects of the next generation of video coding standards are directed to block partitioning schemes. One example of such a partitioning scheme is a quadtree plus binary tree (QTBT) block partitioning structure. According to the QTBT structure, a block can be partitioned according to a quadtree structure for one or more recursive cycles. After some degree of quadtree-based portioning, one or more of the resulting sub-blocks (e.g., leaf nodes) can be further partitioned according to a binary tree structure, provided that the sub-block being partitioned has an area that is no larger than the maximum binary tree root node size allowed under the QTBT partitioning structure.

The quadtree block partitioning structure is described in HEVC, and is the basis for various video coding tools. That is, the designs of various existing coding tools are optimized for being applied to sub-blocks obtained via quadtree partitioning. Quadtree partitioning, by definition, produces square sub-blocks as leaf nodes. As such, the designs of various existing coding tools are optimized for square sub-blocks. However, the binary tree aspects of the QTBT partitioning scheme introduce a flexibility to the leaf node shape, in that a leaf node of a QTBT-partitioned block may be square or a non-square rectangle. As such, the designs of various existing coding tools are not optimized to be applied in all scenarios in which blocks are partitioned according to the QTBT partitioning structure.

This disclosure is generally directed to block size-based constraints that mitigate or potentially eliminate inefficiencies that may arise from applying existing coding tools to sub-blocks obtained via QTBT partitioning. In some examples, techniques of this disclosure set a block level threshold (e.g., in the form of a minimum block size) for various coding tool-related operations. By setting block level thresholds according to the techniques of this disclosure, video encoding devices and video decoding devices may leverage the benefits provided by these coding tools, while still implementing the QTBT partitioning structure and availing of advantages provided by the QTBT partitioning structure.

For instance, coding tools in QTBT may be provide coding gains for particular sized blocks but for other sized blocks, the signaling overhead may be too large and counteracts the benefits of QTBT. With the use of the block-level threshold, the coding gains available for QTBT may be exploited, while reducing the chances that signaling overhead overrides the coding gains.

Figure 1:
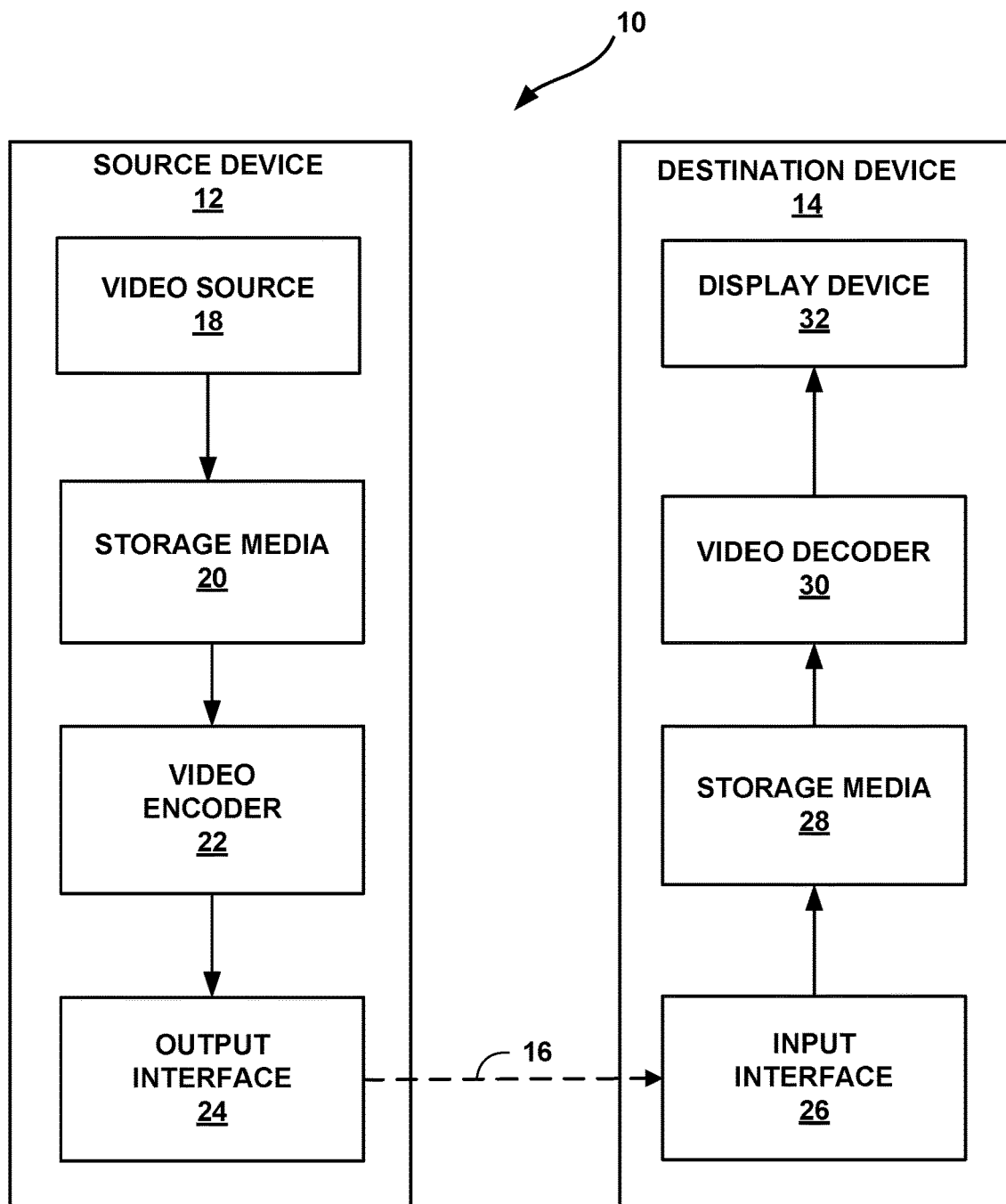
FIG. 1 is a block diagram illustrating an example video encoding and decoding system configured to implement techniques of the disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, a storage medium 20 configured to store video data, a video encoder 22, and an output interface 24. Destination device 14 includes an input interface 26, a storage medium 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device 32.

The illustrated system 10 of FIG. 1 is merely one example. Techniques for processing and/or coding video data may be performed by any digital video encoding and/or decoding device. Although generally the techniques of this disclosure are performed by a video encoding device or video decoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 20) configured to store the video data. The techniques described in this disclosure may be applicable to video coding in general, and may be applied to wireless and/or wired applications. In each case, the captured, pre-captured, or computer-generated video may be encoded by video encoder 22. Output interface 24 may output the encoded video information to a computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 24 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques described in this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 22 of video encoder 22, which is also used by video decoder 30, that includes syntax elements that describe characteristics and/or processing of blocks and other coded units, e.g., groups of pictures (GOPs). Storage media 28 may store encoded video data received by input interface 26. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 22 and video decoder 30 each may be implemented as any of a variety of suitable encoder circuitry, such as one or more microprocessors, processing circuitry (including fixed function circuitry and/or programmable processing circuitry), digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 22 and video decoder 30 may be included in one or more encoders or decoders, either of which may be integrated as part of a combined encoder/decoder (CODEC) in a respective device.

In some examples, video encoder 22 and video decoder 30 may operate according to a video coding standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC) of ITU-T Video Coding Experts Group (VCEG) and ISO/IEC Motion Picture Experts Group (MPEG). Next generation video coding standards are being developed at the time of this disclosure, subsequently to the finalization of ITU-H.265.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 22 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

To generate a coded CTU, video encoder 22 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 22 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 22 may generate predictive blocks (e.g., luma, Cb, and Cr predictive blocks) for prediction blocks (e.g., luma, Cb, and Cr prediction blocks) of each PU of the CU.

Video encoder 22 may use intra prediction or inter prediction to generate the predictive blocks for a PU. If video encoder 22 uses intra prediction to generate the predictive blocks of a PU, video encoder 22 may generate the predictive blocks of the PU based on decoded samples of the picture that includes the PU.

After video encoder 22 generates predictive blocks (e.g., luma, Cb, and Cr predictive blocks) for one or more PUs of a CU, video encoder 22 may generate one or more residual blocks for the CU. As one example, video encoder 22 may generate a luma residual block for the CU. Each sample in the CU's luma residual block indicates a difference between a luma sample in one of the CU's predictive luma blocks and a corresponding sample in the CU's original luma coding block. In addition, video encoder 22 may generate a Cb residual block for the CU. In one example of chroma prediction, each sample in the Cb residual block of a CU may indicate a difference between a Cb sample in one of the CU's predictive Cb blocks and a corresponding sample in the CU's original Cb coding block. Video encoder 22 may also generate a Cr residual block for the CU. Each sample in the CU's Cr residual block may indicate a difference between a Cr sample in one of the CU's predictive Cr blocks and a corresponding sample in the CU's original Cr coding block. However, it should be understood that other techniques for chroma prediction may be used.

Furthermore, video encoder 22 may use quad-tree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 22 may apply one or more transforms a transform block of a TU to generate a coefficient block for the TU. For instance, video encoder 22 may apply one or more transforms to a luma transform block of a TU to generate a luma coefficient block for the TU. A coefficient block may be a two-dimensional array of transform coefficients. A transform coefficient may be a scalar quantity. Video encoder 22 may apply one or more transforms to a Cb transform block of a TU to generate a Cb coefficient block for the TU. Video encoder 22 may apply one or more transforms to a Cr transform block of a TU to generate a Cr coefficient block for the TU.

After generating a coefficient block (e.g., a luma coefficient block, a Cb coefficient block or a Cr coefficient block), video encoder 22 may quantize the coefficient block. Quantization generally refers to a process in which transform coefficients are quantized to possibly reduce the amount of data used to represent the transform coefficients, providing further compression. After video encoder 22 quantizes a coefficient block, video encoder 22 may entropy encode syntax elements indicating the quantized transform coefficients. For example, video encoder 22 may perform Context-Adaptive Binary Arithmetic Coding (CABAC) on the syntax elements indicating the quantized transform coefficients.

Video encoder 22 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RB SP includes zero bits.

Video decoder 30 may receive a bitstream generated by video encoder 22. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 22. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

The following describes block partitioning structure in HEVC. In the HEVC standard (ITU-T H.265 and ISO/IEC 23008-2, January 2013), as well as in "Overview of the High Efficiency Video coding (HEVC) Standard," IEEE Trans. Circuits and Systems for Video Technology, Vol. 22, No. 12, pp. 1649-1668, December 2012 by Sullivan et al, and in "Block Partitioning Structure in the HEVC Standard," IEEE Trans. Circuits and Systems for Video Technology, Vol. 22, No. 12, pp. 1697-1705, December 2012 by Kim et al., each picture is divided into coding tree units (CTUs), which are coded in a raster scan order for a specific tile or slice. A CTU is a square block and represents the root of a quadtree, or the coding tree. The CTU size may range from 8×8 to 64×64 luma samples. The 64×64 size is used in many instances, and may be considered a typical use case. A CTU is partitioned into coding units (CUs) by using a quadtree structure denoted as a coding tree to adapt to various local characteristics. Video encoder 22 and/or video decoder 30 may determine whether to code (e.g., encode or decode, respectively) a picture area using inter-picture (temporal) or intra-picture (spatial) prediction at the CU level. Each 2N×2N size CU can be further split into one 2N×2N, two 2N×N or N×2N, or four N×N prediction units (PUs), according to the PU splitting type. The same prediction process is applied for all samples inside one PU, and video encoder 22 may signal (e.g., transmit) the relevant information to video decoder 30 on a PU basis. After obtaining the residual block by applying the prediction process based on the PU splitting type, a CU can be partitioned into transform units (TUs) according to another quadtree structure.

The following describes quadtree plus binary tree (QTBT) block partitioning structure. In "Block Partitioning Structure for Next Generation Video Coding," ITU-T SG16 Doc. COM16-C966, September 2015 by An et al., and in "QTBT Software," October 2015, available from https://vceg.hhi.fraunhofer.de/svn/svn_HMJEMSoftware/branches/HM-13.0-QTBT/, a quadtree plus binary tree block partitioning structure is proposed. According to the proposed QTBT structure, a CTU (or "CTB" for an I slice), which is the root node of a quadtree, is first partitioned by the quadtree, where the quadtree splitting of one node can be iterated until the node reaches the minimum allowed quadtree leaf node size (MinQTSize). If the quadtree leaf node size is not larger than the maximum allowed binary tree root node size (MaxBTSize), then the quadtree leaf node can be further partitioned according to a binary tree partitioning structure. The binary tree splitting of one node can be iterated until the node reaches the minimum allowed binary tree leaf node size (MinBTSize) or until the iterative partitioning reaches the maximum allowed binary tree depth (MaxBTDepth), whichever occurs first. The binary tree leaf node is named or termed as a CU (or "CB" for an I slice) which is used for prediction (e.g. intra-picture or inter-picture prediction) and transform without any further partitioning.

There are two splitting types, namely, symmetric horizontal splitting and symmetric vertical splitting, in accordance with the binary tree partitioning or splitting. In one example of the QTBT partitioning structure, the CTU size is set as 128×128 (that is, 128×128 luma samples and two corresponding 64×64 chroma samples, assuming a 4:2:0 chroma format), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is of a 128×128 size, then it will not be further split according to the binary tree structure, because the size exceeds the MaxBTSize (i.e., 64×64). Otherwise, the leaf quadtree node can be further partitioned according to the binary tree partitioning structure.

Therefore, the quadtree leaf node is also the root node for the binary tree and has a binary tree depth of 0. When the binary tree depth reaches MaxBTDepth (i.e., 4), it implies that no further splitting is performed. That is, a node that has a binary tree depth value equal to the MaxBTDepth value is the product of binary tree splitting that has been performed for the maximum number of iterations allowed under the binary tree partitioning portion of the QTBT partitioning structure. When the binary tree node has width equal to MinBTSize (i.e., 4), it implies no further horizontal splitting is performed. Similarly, when the binary tree node has height equal to MinBTSize, it implies no further vertical splitting is performed. The leaf nodes of the binary tree are namely CUs further processed by prediction and transform without any further partitioning.

Figure 2:
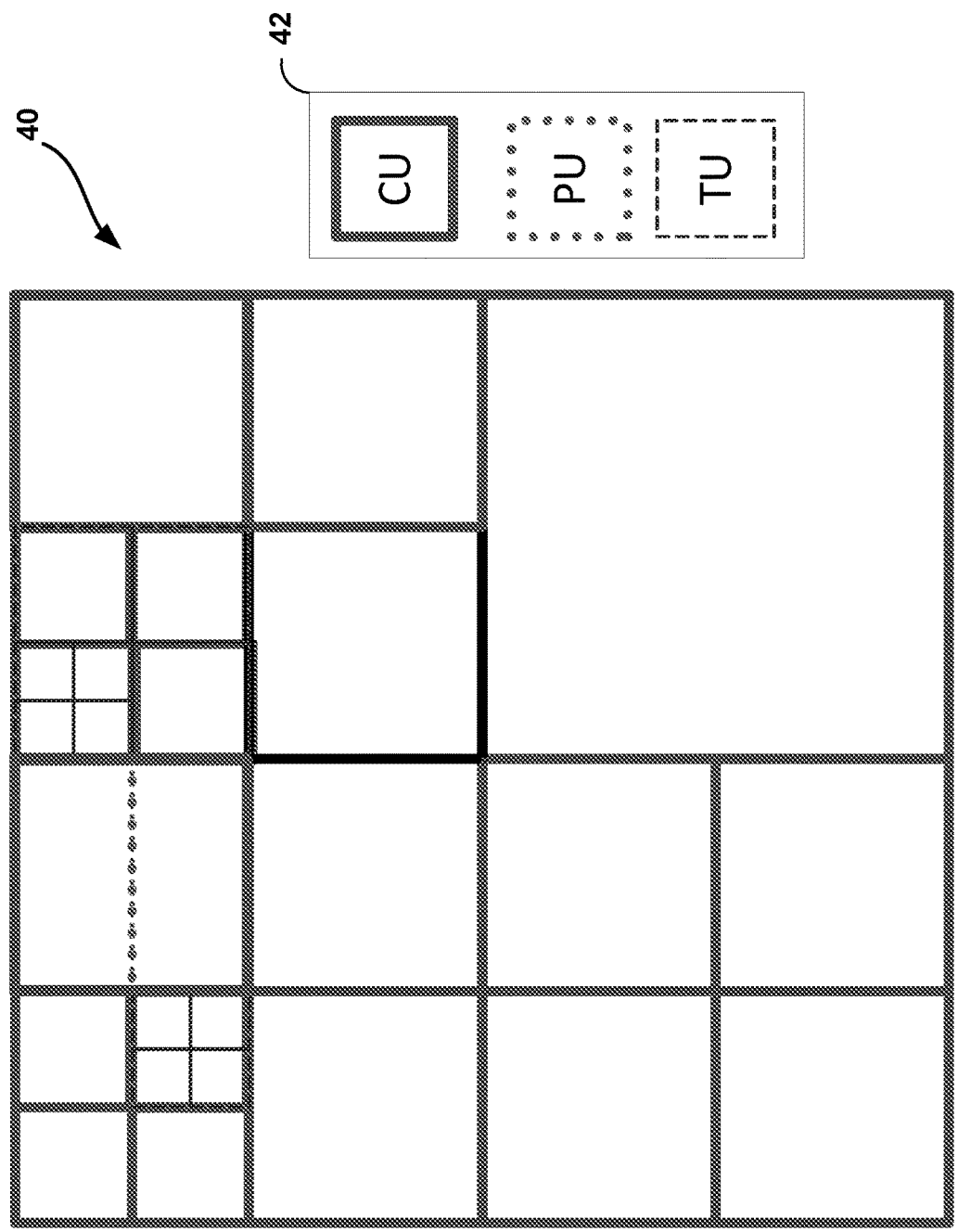
FIG. 2 is a conceptual diagram illustrating an example of a block partitioning structure for a CTU, in accordance with the techniques of this disclosure.

FIG. 2 is a conceptual diagram illustrating an example of block partitioning for a CTU 40 in accordance with HEVC. In the example of FIG. 2, CTU 40 represents a 64×64 CTU. As shown in legend 42 of FIG. 2, solid line borders indicate CU borders, dashed line borders indicate TU borders, and dotted line borders indicate PU borders.

Figure 3:
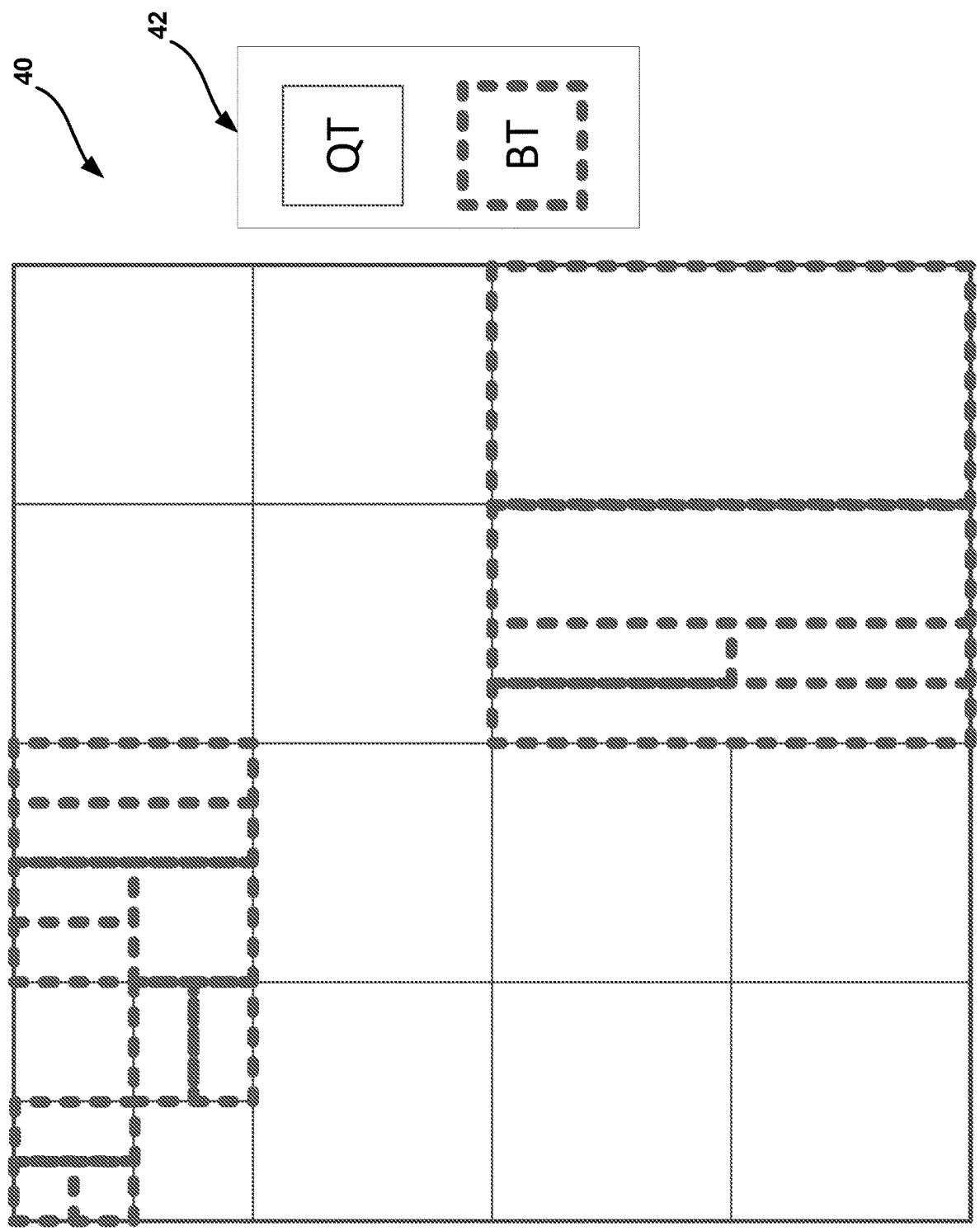
FIG. 3 is a conceptual diagram illustrating an example of block partitioning according to the QTBT partitioning structure.

FIG. 3 is a conceptual diagram illustrating an example of block partitioning according to the QTBT partitioning structure. For instance, the left of FIG. 3 illustrates the QTBT block partitioning schemes with respect to block 44 (which may be, for example, a CTU0). The right of FIG. 3 illustrates the corresponding tree structure (e.g., in the form of a key or legend 46). As shown in legend 46, the solid lines in FIG. 3 indicate quadtree-based splitting, while dotted lines indicate binary tree-based splitting. For each splitting node (i.e., non-leaf node) of the binary tree-based splitting, video encoder 22 may signal one flag to indicate which splitting type (i.e., horizontal or vertical) is used. With respect to the flag, a value of zero (0) indicates horizontal splitting, and a value of one (1) indicates vertical splitting. For the quadtree-based splitting, there is no need to indicate the splitting type since it always split a block horizontally and vertically into 4 sub-blocks of equal size.

For an I-slice, video encoder 22 and/or video decoder 30 may use a luma-chroma-separated blocking partitioning structure in accordance with the QTBT partitioning structure. For instance, video encoder 22 and/or video decoder 30 may partition the luma component of one CTU (e.g., the luma CTB) using the QTBT structure into luma CBs, and may partition the two corresponding chroma components of that CTU (e.g., the two corresponding chroma CTBs) using another QTBT structure into chroma CBs. For P and B slices, the block partitioning structure for luma and chroma is shared. That is, for a P-slice or a B-slice, one CTU (including both luma and chroma) is partitioned by one QTBT structure into CUs. In the QTBT block partitioning structure, the transform and prediction size is always applied at each leaf block partitioning node, and the size is also aligned with the leaf node block size. In this way, the QTBT partitioning structure may potentially do away with the concept of separating CUs, PUs, and TUs. Instead, according to the QTBT partitioning structure, the CU, PU, and TU are unified to form one block. In accordance with the QTBT partitioning structure, the unified block can be a quadtree (QT) node block or a binary tree (BT) node block.

Figures 4A, 4B:
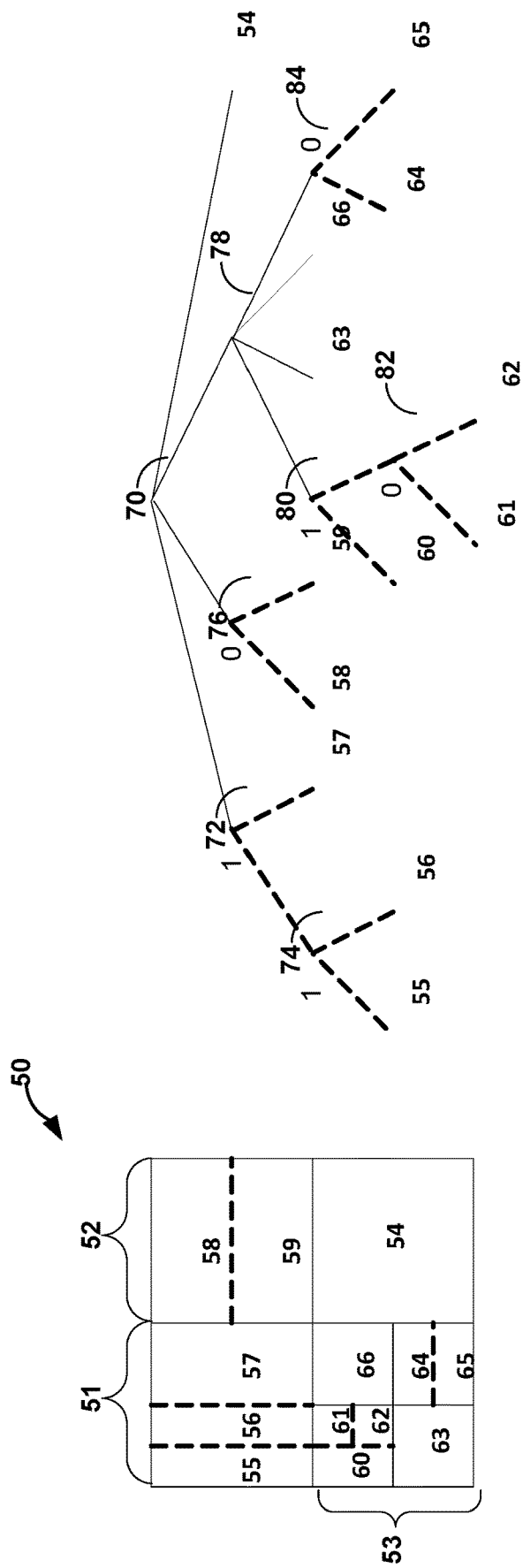
FIGS. 4A and 4B are conceptual diagrams illustrating further examples and details of the QTBT partitioning structure, and the corresponding tree structure for the partitioning, in accordance with one or more aspects of this disclosure.

FIGS. 4A and 4B are conceptual diagrams illustrating further examples and details of the QTBT partitioning structure. FIG. 4A illustrates an example of a block 50 (e.g., a CTB) partitioned using QTBT partitioning techniques. As shown in FIG. 4A, according to QTBT partitioning techniques, each of the resultant blocks is split symmetrically through the center of each block. FIG. 4B illustrates the tree structure corresponding to the block partitioning of FIG. 4A. The solid lines in FIG. 4B indicate QT-based splitting, and dashed lines indicate BT-based splitting. In one example, in each splitting node (i.e., non-leaf node) of the binary tree, video encoder 22 may signal a syntax element (e.g., a flag) to indicate the type of splitting performed, where 0 indicates horizontal splitting and 1 indicates vertical splitting. For the quad-tree splitting, there is no need to indicate the splitting type, as quad-tree splitting always splits a block horizontally and vertically into four (4) sub-blocks with an equal size and of square shape.

As shown in FIG. 4B, at node 70, block 50 is split into the four blocks 51, 52, 53, and 54, shown in FIG. 4A, using QT partitioning. Block 54 is not further split, and is therefore a leaf node. At node 72, block 51 is further split into two blocks using BT partitioning. As shown in FIG. 4B, node 72 is marked with a 1, indicating vertical splitting. That is, video encoder 22 may signal a flag with a value of 1 for node 72, indicating a vertical BT-based split. As such, the splitting at node 72 results in block 57 and the block including both blocks 55 and 56. Blocks 55 and 56 are created by a further vertical splitting at node 74 (as indicated with the 1 at node 74). At node 76, block 52 is further split into two blocks 58 and 59 using BT partitioning. As shown in FIG. 4B, node 76 is marked with a 0, indicating horizontal splitting.

At node 78, block 53 is split into 4 equal size blocks using QT-based partitioning. Blocks 63 and 66 are created from this QT-based partitioning and are not further split. At node 80, the upper left block is first split using vertical binary-tree splitting resulting in block 60 and a right vertical block (as indicated with the 1 at node 80). The right vertical block is then split using horizontal binary-tree splitting into blocks 61 and 62 (as indicated with the 0 at node 82). The lower right block created from the quad-tree splitting at node 78, is split at node 84 using horizontal BT-based splitting into blocks 64 and 65 (as indicated with the 0 at node 84).

In addition to discrete cosine transform (DCT)-II and 4×4 discrete sine transform (DST)-VII which have been employed in HEVC, an Enhanced Multiple Transform ("EMT," or also known as Adaptive Multiple Transform (AMT)) scheme is used for residual coding for both inter-coded and intra-coded blocks. The AMT scheme utilizes multiple selected transforms from the DCT/DST families other than the current transforms described in HEVC. The newly introduced transform matrices are DST-VII, DCT-VIII, DST-I and DCT-V.

The AMT scheme applies to CUs smaller than 64×64. Video encoder 22 may encode and signal a flag to indicate whether AMT applies to a CU. At video decoder 30, whether AMT applies or not is controlled by the value of the CU-level flag signaled by video encoder 22. That is, at video decoder 30, the value of the CU-level flag controls the AMT applicability for all transform units (TUs) within the CU for which the flag is received. Video encoder 22 may set the value of the CU-level flag to be equal to 0, to indicate that DCT-II is applied in the CU to encode the residue. For each TU within an AMT-enabled CU, video encoder 22 may encode and signal two additional flags to identify the horizontal and vertical transform that are to be used/applied at video decoder 30. Upon receiving the CU-level flag signaled by video encoder 22, video decoder 30 may determine, if the value of the flag is equal to zero (0), that DCT-II is to be applied to decode all TUs of the CU to which the flag applies. Video decoder 30 may use the two additional flags received with respect to the CU to identify the horizontal and vertical transform to apply in decoding the CU.

For intra residue coding, due to the different residual statistics of different intra prediction modes, video encoder 22 and/or video decoder 30 may use a mode-dependent transform candidate selection process. Three transform subsets have been defined as shown in Table 1 below, and the transform subset is selected based on the intra prediction mode, as specified in Table 2 below.

TABLE 1

Three pre-defined transform candidate sets

| Transform Set | Transform Candidates |
|---|---|
| 0 | DST-VII, DCT-VIII |
| 1 | DST-VII, DST-I |
| 2 | DST-VII, DCT-VIII |

With the sub-set concept, video decoder 30 may first identify a transform subset based on Table 2 (below) using the Intra prediction mode for each TU when the value of the received CU-level flag is equal to 1. In turn, for each of the horizontal and vertical transform, given the intra prediction mode, video decoder 30 may select a transform subset according to Table 2 below. In turn, according to Table 1 above, video decoder 30 may further identify the transform core from the selected transform subset using an explicitly signaled transform index received from video encoder 22.

TABLE 2

Selected (H)orizontal and (V)ertical transform sets for each Intra prediction mode

| Intra Mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| H | 2 | 1 | 0 | 1 | 0 | 1 | 0 | 1 | 0 | 0 | 0 | 0 | 0 | 1 | 0 | 1 | 0 | 1 |
| V | 2 | 1 | 0 | 1 | 0 | 1 | 0 | 1 | 2 | 2 | 2 | 2 | 2 | 1 | 0 | 1 | 0 | 1 |

| Intra Mode | 18 | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|---|
| H | 0 | 1 | 0 | 1 | 0 | 1 | 2 | 2 | 2 | 2 | 2 | 1 | 0 | 1 | 0 | 1 | 0 |
| V | 0 | 1 | 0 | 1 | 0 | 1 | 0 | 0 | 0 | 0 | 0 | 1 | 0 | 1 | 0 | 1 | 0 |

For inter prediction residual, however, video encoder 22 and/or video decoder 30 may use only one transform set, which consists of DST-VII and DCT-VIII, for all inter modes and for both horizontal and vertical transforms. The complexity of AMT would potentially be relatively high at the encoder side (e.g., at video encoder 22), because totally five (DCT-II and four multiple transform candidates) different transform candidates may need to be evaluated with rate-distortion cost for each residual block in cases where video encoder 22 uses a so-called "brutal-force search." To alleviate this complexity issue at video encoder 22, several optimization methods are designed for algorithm acceleration in the joint exploration model (JEM). The JEM is a video codec platform for the exploration of next-generation video coding technologies. Further aspects of the JEM are described in "Algorithm Description of Joint Exploration Test Model 2" Joint Video Exploration Team (WET) of ITU-T SG 16 WP 3 and ISO/IEC JTC 1/SC 29/WG 11, 2nd Meeting: San Diego, USA, 20-26 Feb. 2016, Document No. JVET-B1001_v1.

The existing techniques described above pose one or more potential problems. Several existing coding tools, e.g., EMT (described in U.S. patent application Ser. No. 15/005,736 filed Jan. 25, 2016), non-separable secondary transform ("NSST," described in U.S. Provisional Applications 62/234,644, filed Sep. 29, 2015 62/294,897 filed Feb. 12, 2016, 62/323,496, filed Apr. 15, 2016, and 62/337,736, filed May 17, 2016, and U.S. patent application Ser. No. 15/270,455, filed Sep. 20, 2016 and Ser. No. 15/270,507, filed Sep. 20, 2016), and position-dependent prediction combination ("PDPC," described in U.S. Provisional Application 62/234,645 filed Sep. 29, 2015, and U.S. patent application Ser. No. 15/272,034, filed Sep. 21, 2016), CU-level signaling on identifying whether intra or inter prediction is applied, are developed on top of HEVC-described block partitioning structure, and these coding tools are optimized and signaled at CU-level, PU-level, or TU-level.

However, the optimization for these coding tools may not be suited to all instances of QTBT-based partitioning. For instance, when applying one or more of these coding tools on top of the QTBT partitioning structure, the optimization may be performed on each QT or BT block node, which in turn can be as small as 4×4. As such, applying the coding tool may be, (though not necessarily in all cases), a sub-optimal solution. For instance, applying the coding tool, as optimized for HEVC-based block partitioning, to a QTBT-partitioned block may represent a sub-optimal solution because the signaling may use significant overhead, which is potentially too much overhead for small block sizes.

Some restrictions in HEVC-based block partitioning structure have been abandoned in QTBT. For instance, according to HEVC-based block partitioning, a CU can be coded (e.g., encoded by video encoder 22 and/or decoded by video decoder 30) using either all intra blocks, or all inter blocks, and a CU is no smaller than 8×8. However, according to the QTBT partitioning structure, even a single 8×8 block may have a mixture of intra coded blocks and inter coded blocks. For small blocks (e.g., blocks with a dimensionality smaller than 8×8), this flexibility in QTBT may require video encoder 22 to signal a significant number of bits to indicate to video decoder 30 whether a block is coded by an Intra mode or an Inter mode. The number of bits signaled (or 'signaling bits') may, in some instances, be too many, considering the size of the block node. With QTBT, coding tools are always optimized and signaled on a QT block node or BT block node, which may not adapt to the varying statistics of images.

Aspects of this disclosure are directed to mitigating and/or resolving one or more of the potential problems discussed above. This disclosure discusses the following techniques, which may also be referred to as "methods" at various portions of this disclosure. It will be appreciated that various devices described herein, such as video encoder 22, video decoder 30, and various components thereof (e.g., components shown in various accompanying drawings) are configured to perform the methods described herein. The following itemized methods may be applied individually, or alternatively, the video coding devices of this disclosure may perform any combination of the following methods.

According to some techniques of this disclosure, video encoder 22 and/or video decoder 30 may define a block level threshold with respect to one or more coding tools, for scenarios in which a block splitting-based partitioning structure is applied for a block. As used herein, a "coding tool" is a specific coding method, technique, or mode that can be switched on or off at a certain block-level. For instance, video encoder 22 and video decoder 30 may implement the block level threshold when applying coding tools such as one or more of intra prediction, inter prediction, inter skip, transform signaling, enhanced multiple transform (EMT), non-separable secondary transform (NSST), signaling on identifying whether intra or inter prediction is applied, or position-dependent prediction combination (PDPC), if the block to which the coding tool applies is to be partitioned according to the HEVC quadtree structure or the QTBT structure. Video encoder 22 may optimize the applicable coding tool, and may signal one or more syntax elements relevant to the coding for a block that meets or exceeds the predetermined block-level threshold for the applicable coding tool. Video encoder 22 may set the block-level threshold such that the threshold is different from the block size at which video encoder 22 and/or video decoder 30 apply prediction and transform.

In some implementations of the techniques of this disclosure, video encoder 22 and/or video decoder 30 may set the block-level threshold, such that the block-level threshold can be expressed in terms of the respective block's dimensions. As examples, the block-level threshold may be expressed in terms of one or more of block area size, or some combination of the block's width and height. For instance, video encoder 22 may set a block area-based threshold of 256 with respect to the EMT coding tool. That is, video encoder 22 may apply EMT-based coding to blocks that cover at least 256 pixels in terms of area. In this example, video encoder 22 may encode and signal an EMT flag and an EMT index such that the EMT flag and index apply on a block-wide basis for blocks that meet or exceed the 256 area threshold. That is, even if a 256-pixel block is further partitioned according to the HEVC quadtree structure or according to the QTBT structure, the value of the EMT flag applies to all sub-blocks of the 256-pixel block. According to the QTBT partitioning structure, binary partitioning may become applicable only after a 256-pixel is further partitioned. That is, a 256-pixel block may have a square form factor, regardless of whether the block is split according to HEVC quadtree partitioning, or according to the QTBT partitioning structure.

In this implementation, video encoder 22 may determine whether or not the 256-pixel block is to be encoded using EMT, by applying bitrate optimization across the block. That is, video encoder 22 may select between two options (of implementing or not implementing EMT), by running the bitrate optimization across all of the sub-blocks of the threshold-sized block. If video encoder 22 determines, based on the results of the block-wide bitrate optimization, that EMT is to be applied across the 256-pixel block, then video encoder 22 may encode an EMT flag in an "enabled" state (e.g., by setting the value of the flag to a value of 1). If video encoder 22 determines that the EMT flag should be set to the enabled state (e.g., set to the value of 1) based on the bitrate optimization operation(s), then video encoder 22 may set the EMT flag to a value of 1 for the entire 256-pixel block. That is, video encoder 22 may encode a single EMT flag for the entire 256-pixel block, and may set the value of the EMT flag to 1. In turn, based on the EMT flag having the value of 1 for the entire 256-pixel block, video encoder 22 may encode and signal a respective EMT index value for each sub-block of the 256-pixel block.

In some examples of the block-level thresholding techniques with respect to coding tools, video encoder 22 may set the block-level threshold based on criteria other than block size dimensions. For instance, video encoder 22 may set the block-level threshold based on one or more of a CTU, slice, tile, picture, or group of pictures (GOP) basis. That is, the block-level threshold may vary based on one or more of the above criteria.

Alternatively, in some implementations, video encoder 22 may update the block-level threshold on a CTU, slice, tile, picture, or GOP basis, using encoded information of a previously-encoded CTU, slice, tile, picture or GOP, respectively. In some instances, where video encoder 22 varies the block-level threshold using previously-encoded information, video encoder 22 may set the block level, for example, based on a count of how many times, for each block size, the prediction and/or transform is performed. In some examples, video encoder 22 may set the block-level threshold to a default value. Examples of default values include, but are not limited to, the values of 64 or 256. In some examples, video encoder 22 may signal the block-level threshold depending on the slice type for the slice that includes the block, e.g., whether the slice is an Intra, P or B slice. While the block-level threshold may be one of several pre-defined fixed values, video encoder 22 may apply a different value for different coding configurations or image components. For instance, video encoder 22 may apply a different value for the block-level threshold depending on certain factors, such as whether the current slice is an Intra, P or B slice, and/or whether the current block is a luma or chroma component.

In some examples, video encoder 22 may signal the block-level threshold out of band with respect to the block to which the threshold value applies. For example, video encoder 22 may signal the block-level threshold in one or more syntax structures such as a slice header, a picture parameter set (PPS), a video parameter set (VPS), or a sequence parameter set (SPS). Upon receiving the block-level threshold (e.g., whether in-band or out-of-band with respect to the applicable encoded block), video decoder 30 may use the block-level threshold as a condition for applying the reciprocal (decoder-side) coding tool with respect to the encoded block. In the implementation described above with respect to the block area-based threshold for application of EMT, video decoder 30 may apply any received EMT flag to a block that meets or exceeds the signaled block-level threshold area. For instance, if the block-level threshold area received (e.g., in a slice header, VPS, PPS, OR SPS) reflects an area of 256 pixels, then video decoder 30 may apply any received EMT flag to a block that is at least 256 pixels in area.

For instance, video decoder 30 may receive an EMT flag that is set to an enabled state (e.g., to a value of 1). Based on the enabled state of the EMT flag, video decoder 30 may activate the EMT coding tool with respect to the decoding of a block that covers at least 256 pixels in area, to which the EMT flag applies. That is, video decoder 30 may activate the EMT coding tool with respect to all sub-blocks of the block that is at least 256 pixels in area. In turn, video decoder 30 may receive an individual EMT index with respect to each sub-block of the block that is at least 256 pixels in area. Based on each received EMT index value, video decoder 30 may reconstruct each sub-block of the EMT-activated block using the EMT coding tool. In this way, video encoder 22 and video decoder 30 may mitigate the need for EMT flag signaling according to the techniques of this disclosure, by leveraging an EMT flag at the threshold block level, instead of requiring an EMT flag for each individual sub-block, regardless of the partitioning scheme used to obtain the sub-blocks.

In this way, video encoder 22 and video decoder 30 may implement the block-level thresholding techniques of this disclosure to apply existing coding tools, without requiring any changes in the optimization of the coding tools to accommodate QTBT partitioning. Coding tool-based syntax elements, such as the EMT flag, are signaled at the CU level in accordance with the HEVC quadtree partitioning structure. An HEVC-compliant CU can vary size, but does not fall below an 8×8 dimensionality. However, the QTBT partitioning structure allows for an 8×8 block to be further partitioned, sometimes to the extent of being split into up to four sub-blocks. As such, extending the optimization of existing coding tools (e.g., EMT, PDPC, etc.) for the QTBT partitioning structure would cause a fourfold increase in flag coding. As such, video encoder 22 would be required to encode and signal four flags for a QTBT-partitioned block, where video encoder 22 would have been required to encode and signal a single flag for an HEVC quadtree-partitioned block. Similarly, video decoder 30 would be required to receive and process four flags for a QTBT-partitioned block, where video decoder 30 would have been required to receive and process a single flag for an HEVC quadtree-partitioned block.

As illustrated by the example of block area-based thresholding for the EMT flag, techniques of this disclosure enable video encoder 22 and video decoder 30 to continue to leverage HEVC-optimized coding tools (such as EMT) with respect to QTBT-partitioned blocks, without the fourfold increase in complexity and bandwidth consumption. That is, the block area-based thresholding techniques of this disclosure enable video encoder 22 and video decoder 30 to process a single flag for a square 256-pixel block, even if the block is partitioned according to the QTBT partitioning structure. In this way, the techniques of this disclosure enable video encoder 22 and video decoder 30 to use existing HEVC-optimized coding tools, while leveraging the more recent QTBT block partitioning structure. That is, the techniques of this disclosure enable the continued use of existing (HEVC optimized) coding tools without needing changes for the QTBT partitioning structure. For instance, using the block-level threshold, as described in this disclosure, allows for coding tools to be used with QTBT partitioning structure without necessarily requiring changes to the coding tools (although changes to the coding tools is possible).

According to some aspects of this disclosure, video encoder 22 and/or video decoder 30 may apply a block-level threshold to determine the lowest block-level at which only intra coding is applied, or only inter coding is applied. For instance, video encoder 22 may specify the smallest block level at which only intra coding or inter coding is applied, based on a size-based block-level threshold. For instance, video encoder 22 may indicate or specify that no mixture of intra coding and inter coding is allowed at or below the block-level threshold. That is, video encoder 22 may apply only inter coding or only intra coding (but not a combination of both) to all sub-blocks of a block that has an area equal to or smaller than the threshold area. Said another way, if a block is at or within the area threshold, then video encoder 22 may apply either intra coding to all sub-blocks, or may apply inter coding to encode all sub-blocks of the block, regardless of the partitioning structure(s) used to form the sub-blocks. While described with respect to the block area, it will be appreciated that video encoder 22 may, in some examples, determine and signal the block-level threshold based on other size dimensions, such as block width and/or block height. Accordingly, the term block area includes size based on area and size when considering the block width and/or block height. The term block area should not be considered limited to a two dimensional measure of size, but includes a single dimension as well (e.g., width and/or height).

In some examples, video encoder 22 may vary the block-level threshold based on one or more of a CTU basis, a slice basis, a tile basis, a picture basis, or a group of pictures (GOP) basis. Additionally, in various examples of video encoder 22 applying a block-level threshold for allowing or disallowing any mixture of intra and inter coding, video encoder 22 may signal the block-level threshold out of band with respect to the corresponding block, such as in a slice header, picture parameter set (PPS), video parameter set (VPS) or sequence parameter set (SPS).

Alternatively, video encoder 22 may update the block-level threshold on one or more of a CTU basis, a slice basis, a tile basis, a picture basis, or a GOP basis, using the coded information of a previously encoded CTU, slice, tile, picture or GOP, respectively. For instance, video encoder 22 may update the block-level threshold based on a count of how many times, for each block size, the prediction and/or transform is performed. In some alternatives, video encoder 22 may set the block-level threshold to a default value, such as 64 or 256. In some examples, video encoder 22 may signal the block-level threshold depending on the slice type, e.g., whether the slice is an intra slice, P slice, or B slice.

In some implementations of the block-level thresholding for intra coding or inter coding determinations, the block-level threshold updating may be optional. For example, video encoder 22 may signal a "present" flag (which is an existing flag) to provide information related to the block-level threshold value. For instance, video encoder 22 may set the flag to a 0 value to indicate that the block-level threshold is set to a default threshold level or default value. In cases of the block-level threshold being set to a default value, video encoder 22 may optionally signal the block-level threshold value at a higher structural level (such as in a PPS, SPS, or VPS). On the other hand, video encoder 22 may set the value of the present flag to a value of 1, to indicate that the block-level threshold value is or will be signaled directly. In some instances, to signal the block-level threshold directly, video encoder 22 may adjust the signaled value by excluding any case where the level is equal to the default value.

In some examples, video encoder 22 may signal the block-level threshold depending on the slice type for the slice that includes the block, e.g., whether the slice is an Intra, P or B slice. While the block-level threshold may be one of several pre-defined fixed values, video encoder 22 may apply a different value for different coding configurations or image components. For instance, video encoder 22 may apply a different value for the block-level threshold depending on certain factors, such as whether the current slice is an intra slice, a P slice, or a B slice, and/or whether the current block is a luma or chroma component.

In some instances, video encoder 22 may implement one or more exceptions to the choice between intra coding and inter coding for a block that is at or below the block-level threshold. That is, in some scenarios (which form exceptions to the block-level thresholding for intra-only or inter-only blocks), video encoder 22 may use both intra and inter coding to encode sub-blocks of a block that is at or below the block-level threshold. In some such scenarios, if video encoder 22 is configured to make exceptions to the inter-only or intra-only choice, video encoder 22 may encode and signal a flag for a block that is at or within the block-level threshold, to indicate whether a mixture of intra and inter coding is allowed for the respective sub-blocks of the block.

For instance, video encoder 22 may set the flag to a value of 0 to indicate that no mixture of intra coding and inter coding is allowed for the particular corresponding block. In this example, video encoder 22 may set the flag to a value of 1 to indicate that a mixture of inter coding and intra coding is allowed with respect to the coding of the sub-blocks of the corresponding block. The flag that video encoder 22 may encode and signal to indicate whether or not a mixture of intra coding and inter coding is permitted with respect to a block may represent a new flag, in that the flag represents an additional syntax element with respect to syntax elements specified in existing video coding standards such as H.264 and/or HEVC.

In examples where video encoder 22 uses block-level thresholding to determine the lowest block-level at which only intra coding or inter coding can be applied, video decoder 30 may implement reciprocal operations to use the block-level threshold to determine the lowest block-level at which only intra coding or inter coding can be applied to reconstruct the sub-blocks of the block. For instance, video decoder 30 may determine the smallest block level at which only intra coding or inter coding is to be applied, based on a size-based block-level threshold specified by video encoder 22. For instance, video decoder 30 may determine, based on data included in the bitstream signaled by video encoder 22, that no mixture of intra coding and inter coding is allowed for blocks that are at or below the block-level threshold. That is, video decoder 30 may apply only inter coding or only intra coding (but not a combination of both) to reconstruct all sub-blocks of an encoded block that has an area equal to or smaller than the threshold area. In examples where video encoder 22 specifies the block-level threshold in terms of block area, if a block is at or within the area threshold, then video decoder 30 may apply either intra coding to reconstruct all sub-blocks of the block, or may apply inter coding to reconstruct all sub-blocks of the block, regardless of the partitioning structure(s) used to form the sub-blocks. While described with respect to the block area, it will be appreciated that video decoder 30 may, in some examples, determine the block-level threshold based on other size dimensions, such as block width and/or block height.

In some examples, video decoder 30 may detect variations of the block-level threshold based on one or more of a CTU basis, a slice basis, a tile basis, a picture basis, or a GOP basis. Additionally, in various examples, video decoder 30 may obtain the block-level threshold from syntax structures that are received out-of-band with respect to the corresponding block, such as in a slice header, PPS, VPS, or SPS that is applicable to the block. In some examples, video decoder 30 may determine the block-level threshold based on bitstream information that is dependent on the slice type, e.g., whether the slice is an intra slice, P slice, or B slice.

In some implementations of the block-level thresholding for intra coding or inter coding determinations, the block-level threshold updating may be optional. For example, video decoder 30 may receive and process a "present" flag (which is an existing flag) to determine information related to the block-level threshold value. For instance, video decoder 30 may recover a 0 value of the flag to determine that the block-level threshold is set to a default threshold level or default value. In cases of the block-level threshold being set to a default value, video decoder 20 may, in some scenarios, receive the block-level threshold value within a higher structural level (such as in a PPS, SPS, or VPS) of the bitstream. On the other hand, video decoder 30 may, if the value of the present flag is set to a value of 1, determine that the block-level threshold value is or will be received directly.

If video decoder 30 does not receive the flag, video decoder 30 may infer the value of the flag to be 0. That is, in cases where the flag is not received with respect to a block, video decoder 30 may determine that the block-level threshold is set to a default value, and may therefore use the default value as the threshold block level with respect to applying the relevant coding tool(s) to the block. In some instances, video decoder 30 may receive an adjusted value, such that the signaled value excludes any case where the level is equal to the default value.

In some examples, video decoder 30 may receive the block-level threshold as a value that is dependent on the slice type for the slice that includes the block, e.g., whether the slice is an intra slice, a P slice, or a B slice. While the block-level threshold may be one of several pre-defined fixed values, video decoder 30 may apply a different value for different coding configurations or image components. For instance, video decoder 30 may apply a different value for the block-level threshold depending on certain factors, such as whether the current slice is an intra slice, a P slice, or a B slice, and/or whether the current block represents a luma or chroma component.

In some instances, video decoder 30 may implement one or more exceptions to the choice between intra coding and inter coding for a block that is at or below the block-level threshold. That is, in some scenarios (which form exceptions to the block-level thresholding for intra-only or inter-only blocks), video decoder 30 may use both intra and inter coding to reconstruct encoded sub-blocks of a block that is at or below the block-level threshold. In some such scenarios, if video decoder 30 is configured to make exceptions to the inter-only or intra-only choice, video decoder 30 may receive and reconstruct a flag (which is included in the bitstream signaled by video encoder 22) for an encoded block that is at or within the block-level threshold. The value of the flag may indicate whether a mixture of intra and inter coding is permitted with respect to reconstructing the respective sub-blocks of the block. For instance, video decoder 30 may determine, if the flag is set to a value of 0, that no mixture of intra coding and inter coding is allowed for the particular corresponding block. In this example, video decoder 30 may use only intra coding or only inter coding (but not a combination thereof) to reconstruct the various sub-blocks of the block. According to this implementation, if video decoder 30 determines that the flag is set to a value of 1, video decoder 30 may determine that a mixture of inter coding and intra coding is allowed with respect to the reconstruction of the sub-blocks of the corresponding block. The flag that video decoder 30 may receive and reconstruct to determine whether or not a mixture of intra coding and inter coding is permitted with respect to reconstructing a block may represent a new flag, in that the flag represents an additional syntax element with respect to syntax elements specified in existing video coding standards such as H.264 and/or HEVC.

In some examples, video encoder 22 and/or video decoder 30 may implement the block-level constraint for the optimization of one or more coding tools, but remove the constraint in cases where a threshold-meeting or threshold-exceeding block includes a mixture of intra coded and inter coded sub-blocks. For instance, some coding tools, such as PDPC and NSST, are optimized only for intra coding, according to HEVC. EMT is optimized for both inter coding and intra coding, and as such, can be implemented as EMT-inter and/or EMT-intra. Some coding tools are optimized only for inter coding according to HEVC. As such, the removal of the block-level constraint for coding optimization in the case of blocks that include both intra-coded and inter-coded sub-blocks is applicable to any such coding tools.

For instance, because the EMT coding tool is implemented as either EMT-intra or as EMT-inter for a given block, a block-level threshold may impede the use of the EMT coding tool in an instance where the block includes both intra-coded and inter-coded sub-blocks, because the EMT coding tools is applied as either EMT-intra or as EMT-inter. Similarly, the block-level constraint may impede the use of the PDPC tool or the NSST tool in instances where the block includes both intra-coded and inter-coded sub-blocks, because each of the PDPC tool and NSST tool is optimized for intra-coded blocks. In this way, video encoder 22 and video decoder 30 may implement block-level constraints for applying coding tools to accommodate the QTBT partitioning structure, but may remove the constraint in cases of blocks that include a mixture of inter-coded and intra-coded sub-blocks, to leverage the intra-only or inter-only optimization of the coding tools.

According to some techniques of this disclosure, video encoder 22 may implement block-level thresholding with respect to signaling information for one or more coding tools. In one implementation, video encoder 22 may use a single block-level threshold with respect to signaling information for all coding tools that are applied by or available to video encoder 22. For instance, video encoder 22 may signal a single EMT flag, or a single PDPC flag, or a single NSST flag, only for a block that is at least at the threshold block-level. That is, in this implementation, the block-level threshold has a static value regardless of which coding tool that video encoder 22 uses to encode the block.

In another implementation of the block-level thresholding for coding tool signaling, video encoder 22 may use individual block-level threshold values on a coding tool by coding tool basis. For instance, video encoder 22 may signal an EMT flag only for blocks that meet a first threshold level, a PDPC flag only for blocks that meet a second threshold level, and an NSST flag only for blocks that meet a third threshold level.

According to some examples of this disclosure, video encoder 22 and video decoder 30 may apply a unique block-level threshold for a single coding tool for a single block, at any given time. For instance, a block that meets or exceeds the block-level threshold (the threshold representing a minimum block level at which syntax signaling can be performed) may compose a picture frame without overlaps. For example, according to this implementation, video encoder 22 and video decoder 30 may not further partition any block if the partitioning would result in at least one sub-block that is smaller than the block-level threshold. That is, video encoder 22 and video decoder 30 may not include smaller sub-blocks in more than one block with the threshold level size.

Video encoder 22 may, in some scenarios, signal a so-called "virtual block." More specifically, when signaling a virtual block, video encoder 22 may signal only a subset of the encoded data that forms the block. For instance, in signaling a virtual block, video encoder 22 may group and signal only certain syntax elements with respect to the encoded video data of the block. In contrast to a virtual block, a "real block" represents an encoded block of video data for which video encoder 22 signals the full set of encoded information.

According to some techniques of this disclosure, video encoder 22 may detect that a virtual block meets the threshold size for the signaling of coding tool information. In some such scenarios, video encoder 22 may determine that a virtual block qualifies as a real block (that is, that the virtual block and the corresponding real block are the same, single block). Video encoder 22 may detect such a scenario, for example, if video encoder 22 determines that a block is not further split and thus, that the real block (the size of which meets or exceeds the threshold size) is the final block. In this case, video encoder 22 may condition and/or postpone any signaling that is customarily performed with respect to the virtual block. Instead, video encoder 22 may signal the virtual block information with respect to the real block instead.

By implementing the techniques of this disclosure to signal virtual block information with respect to a real block instead in certain scenarios, video encoder 22 may provide a potential bitrate improvement in certain cases. For instance, in cases where syntax signaling is done only for certain prediction modes, a particular prediction mode may not be available to video encoder 22 with respect to signaling for the virtual block. In such scenarios, video encoder 22 may condition the signaling for the virtual block on the value of a split flag, and on the block size being equal to (or greater than) the threshold size. If video encoder 22 detects that the corresponding real block is not further split and that the block size is at least equal to the threshold size, then video encoder 22 may determine that the real block is final. As such, video encoder 22 may implement the techniques of this disclosure to determine that signaling of syntax elements that are customarily signaled as part of the virtual block can be done subsequently, and can be signaled purely with respect to the real block.

Video encoder 22 may perform this conditional syntax signaling such that the signaling is dependent on whether the combination of the resulting sub-blocks (which are distinguished from one another) are possible at the size of the virtual block. For example, video encoder 22 may implement the conditional signaling such that the signaling is dependent on a slice type, if sub-blocks are differentiated based on being encoded using intra prediction and inter prediction modes. In the case of a block being included in an I-slice, inter prediction is not an option for the encoding of the block. As such, in the case of the block being included in an I-slice, video encoder 22 may determine that the conditional signaling is not required.

An example of the conditional signaling techniques of this disclosure is described herein with respect to the PDPC coding tool. Application of the PDPC coding tool in encoding a block of video data provides one or more examples in which video encoder 22 may implement the conditional signaling aspects of this disclosure to provide bitrate improvements. In some instances, video decoder 30 may infer a split flag at a picture boundary. For example, if video encoder 22 determines that the block is sufficiently large for the block to cross the picture boundary, video encoder 22 may not signal the split flag. In this example, video decoder 30 may infer the large block as being split. That is, video encoder 22 may implement the conditional signaling to avoid signaling a split flag at a picture boundary that a block crosses. In this case, video decoder 30 may be configured to infer the block split at the picture boundary.

An example of the conditional signaling techniques of this disclosure is described below, with respect to the PDPC coding tool. For a block that meets or exceeds a block-level threshold of this disclosure, if the block is encoded using the PDPC coding tool, video encoder 22 may signal a PDPC flag (also referred to as a "PDPC use flag") in an enabled state, and may optionally signal one or more PDPC indices (or "PDPC index values"). Upon receiving a PDPC flag set to the enabled state, video decoder 30 may infer that each and every sub-block of the threshold-sized block (regardless of the partitioning scheme(s) used to obtain the sub-blocks) is to be reconstructed using the PDPC coding tool. That is, video decoder 30 may infer PDPC flag values for the smaller sub-blocks to be equal to the single PDPC flag value received for the larger block that is at or in excess of the threshold level. In one example, video encoder 22 and video decoder 30 may use a threshold level equal to 64 samples for a luma component block that is to be encoded and decoded using the PDPC coding tool.

As described above, in some instances of conditional signaling according to this disclosure, video encoder 22 may condition and thereby avoid signaling the PDPC flags and indices for a block that meets or exceeds the threshold block size. More specifically, video encoder 22 may condition the signaling of the PDPC flag and/or indices on a determination of whether the block is split further. That is, video encoder 22 may not signal the PDPC flag or any PDPC indices for a block, if video encoder 22 determines that the block is not further split. Instead, in the case that the block is not split any further, video encoder 22 may perform the PDPC signaling is done according to the signaling placement provided by existing PDPC signaling techniques. That is, if video encoder 22 determines that the block is not split any further, video encoder 22 may signal any PDPC information after the prediction mode is parsed and available.

As described above, PDPC is a coding tool that is optimized for intra prediction mode. Therefore, video encoder 22 may not apply the PDPC coding tool for any inter-predicted blocks or sub-blocks. In cases where video encoder 22 does not implement conditional signaling, video encoder 22 may signal the PDPC information for the block that is equal to or larger than the threshold size, provided that that the block is not further split and therefore does not include any inter-coded sub-blocks. Again, PDPC information may not be needed if the block includes inter-coded sub-blocks, and thus, signaling of sub-block-level PDPC information may cause bitrate wastage due to unnecessary bits being signaled.

Video encoder 22 may also extend the conditional signaling techniques of this disclosure to instances of applying versions of PDPC that use more than one flag to indicate prediction parameters. One such example is a PDPC version that utilizes four sets of parameters, per block shape, and per prediction mode. Video encoder 22 may implement different thresholds on block size to define the number of flags to be encoded, or alternatively, inherited and shared. In this way, video encoder 22 may avail of a greater number of PDPC parameter options at higher tree levels, where flag coding overhead may be relatively small. On the other hand, video encoder 22 may use a lesser number of PDPC parameter options (possibly as few as a single option) at lower tree levels, where the relative overhead, per flag, is greater.

In some examples of this disclosure, video encoder 22 may implement another extension by which video encoder 22 may use table-based rules for syntax-signaling decisions, instead of using a single threshold. In one case of the table-based syntax-signaling determination techniques of this disclosure, video encoder 22 may use a table in which table entries include the width and/or height of the block partition. In this example, the table elements may represent lists with syntax-signaling modifications that are valid for partitions derived from the pertinent partition shape, regardless of whether the partition shape is the result of quadtree-based partitioning or QTBT-based partitioning.

In some examples, video encoder 22 and video decoder 30 may, as an alternative to the block-level thresholding for coding tools as described above, instead implement a block-level threshold that does not correspond to an actual block in the block decomposition process. In these examples, if splitting a block results in two sub-blocks (BT-partitioning) or four sub-blocks (QT-partitioning) sub-blocks that are below the block-level threshold, then video encoder 22 may signal the coding tool-related syntax elements at the resulting sub-block size. An example of such a sub-block-based block-level threshold is 392, or any threshold size that is not a power of 2. In some instances, video encoder 22 may use a sub-block-based block-level threshold that is a floating point value.

According to some examples of this disclosure, video encoder 22 may signal a coding tool-related syntax element (e.g., the EMT flag) at the very first instance where video encoder 22 detects that the block size is the same as or below the block-level threshold. Once the coding tool-related syntax element is signaled for a block, video encoder 22 may not signal the corresponding coding tool-related syntax element for any sub-blocks that result from further splits of the block. That is, according to these examples, video encoder 22 may signal the coding tool-related syntax element (e.g., the EMT flag) with respect to the first sub-block of a block, upon determining that the block is at or below the predetermined block-level threshold.

Figure 5:
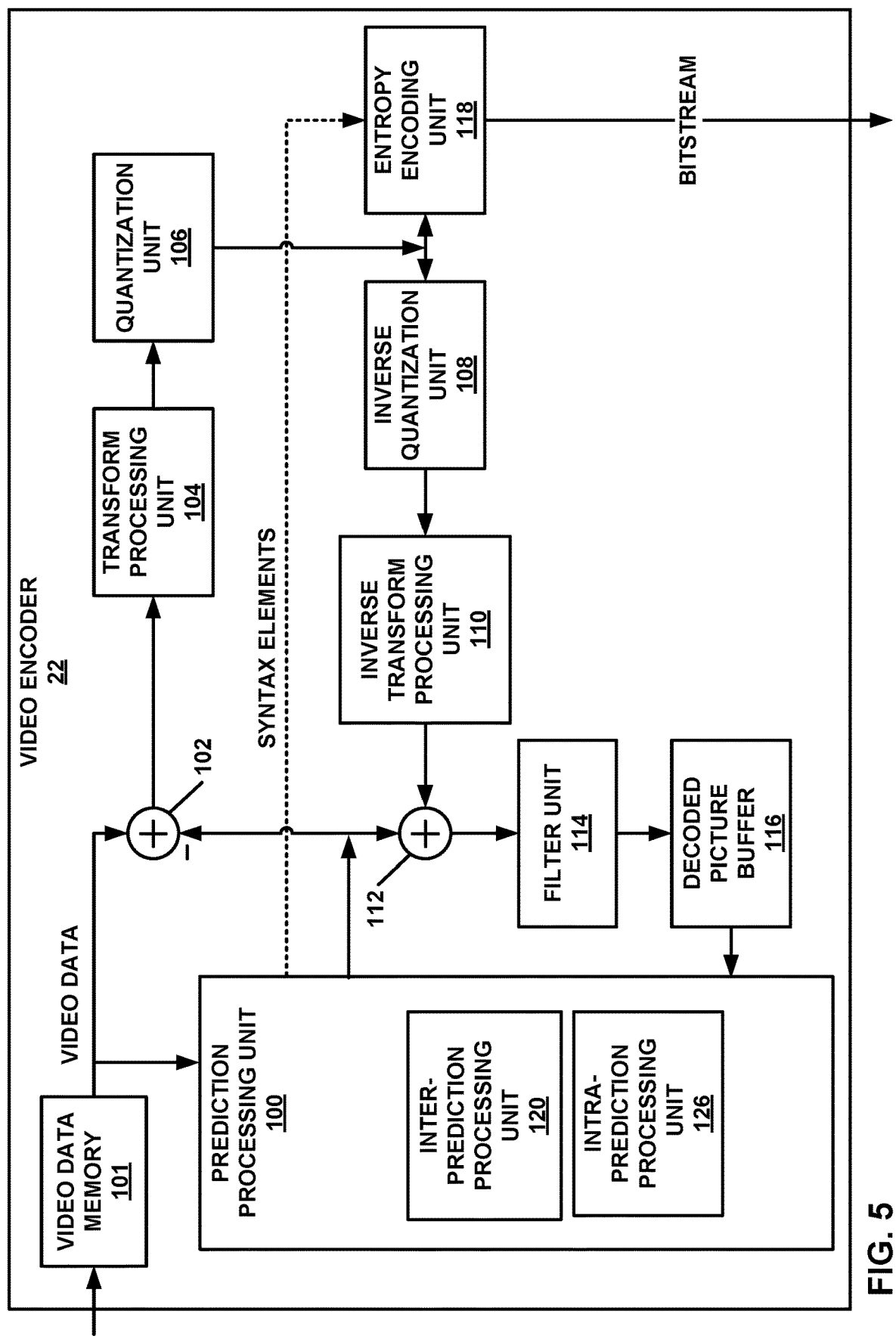
FIG. 5 is a block diagram illustrating an example of a video encoder configured to implement techniques of the disclosure.

FIG. 5 is a block diagram illustrating an example video encoder 22 that may implement the techniques of this disclosure. FIG. 5 is provided for purposes of explanation and should not be considered limiting of the techniques as broadly exemplified and described in this disclosure. The techniques of this disclosure may be applicable to various coding standards or methods.

In the example of FIG. 5, video encoder 22 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 22. The video data stored in video data memory 101 may be obtained, for example, from video source 18. Decoded picture buffer 116 may be a reference picture memory that stores reference video data for use in encoding video data by video encoder 22, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 22, or off-chip relative to those components. Video data memory 101 may be the same as or part of storage media 20 of FIG. 1.

Video encoder 22 receives video data. Video encoder 22 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure. In accordance with one or more techniques of this disclosure, for each respective non-leaf node of the tree structure at each depth level of the tree structure, there are a plurality of allowed splitting patterns for the respective non-leaf node and the video block corresponding to the respective non-leaf node is partitioned into video blocks corresponding to the child nodes of the respective non-leaf node according to one of the plurality of allowable splitting patterns.

Video encoder 22 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 22 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 22 and video decoder 30 may support PU sizes of 2N×2N or N×N for intra prediction, and symmetric PU sizes of 2N×2N, 2N×N, N×2N, N×N, or similar for inter prediction. Video encoder 22 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 22 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 22 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 22. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 22 may output a bitstream that includes entropy-encoded data generated by entropy encoding unit 118. For instance, the bitstream may include data that represents a RQT for a CU.

Listed below are various implementations of the techniques of this disclosure that video encoder 22 (or one or more components thereof) may be configured to perform. The various implementations are numbered using Arabic numerals '1', '2', and so on described below, with various options described at various levels of sub-headings.

1. When a block splitting based block partitioning structure is applied for video coding, e.g., HEVC or QTBT, for a particular coding tool (examples of a particular coding tools include, but are not limited to: intra prediction, inter prediction, inter skip, transform signaling, EMT, NSST, PDPC, and so on), a block level threshold is defined. This particular coding tool is optimized and signaled for a block that is equal to this block level threshold, or exceeds the block-level threshold. The block-level threshold can be different from the block size at which prediction and transform is applied. A coding tool is a specific coding method, technique, or mode that can be switched on or off at a certain block-level.
    a) The block-level threshold can be expressed in terms of a block area size, or block width and height.
    b) The block-level threshold may vary on a CTU, slice, tile, picture, or group of pictures (GOP) basis.
        The block-level threshold may be signaled in a slice header, PPS, VPS or SPS.
        Alternatively, the block-level threshold may be updated on a CTU, slice, tile, picture, or GOP basis using the coded information of previous CTU, slice, tile, picture or GOP, respectively, e.g., by counting how many times, for each block size, the prediction and/or transform is performed.
        Alternatively, the block-level threshold may be set to a default value, e.g., 64 or 256, or signaled depending on the slice type, e.g., whether the slice is an Intra, P or B slice.
    c) The block-level threshold may be pre-defined fixed values, but a different value may be applied for different coding configurations or image component, e.g., whether the current slice is an Intra, P or B slice, whether the current block is a luma or chroma component.

2. A block level threshold may also specify the smallest block level at which only intra coding or inter coding is applied. No mixture of intra coding and inter coding is allowed at or below this given block level threshold.
    a) The block-level threshold may be expressed as a block area size, or block width and height.
    b) The block-level threshold may vary on a CTU, slice, tile, picture, or group of pictures (GOP) basis.
        The block-level threshold may be signaled in a slice header, picture parameter set (PPS), video parameter set (VPS) or sequence parameter set (SPS).
        Alternatively, the block-level threshold may be updated on a CTU, slice, tile, picture, or GOP basis using the coded information of a previous CTU, slice, tile, picture or GOP, respectively, e.g., by counting how many times, for each block size, the prediction and/or transform is performed.
        Alternatively, the block-level threshold may be set to a default value, e.g., 64 or 256, or signaled depending on the slice type, e.g., whether the slice is an Intra, P or B slice.
        Updating may be optional. For example, a present flag can be signaled, and if that flag is set to a 0 value, the default threshold level is used, which optionally can be signaled at the higher structural level (such as PPS, SPS, VPS). In this example, if the present flag is set equal to a value of 1, then the threshold level is signaled directly. During direct signaling, the signaled value may be adjusted by excluding the case when the level is equal to the default value.
    c) The block-level threshold may use pre-defined fixed values, but different values may be applied for different coding configurations or image components, e.g., whether the current slice is an Intra, P or B slice, whether the current block is a luma or chroma component.
    d) Alternatively, a flag may be further signaled for a block at this block level threshold to indicate whether mixture of Intra and Inter coding is allowed for sub-blocks that are below this block level threshold and included in the current block.

3. According to this implementation, the limitation for a specific coding tool, that the coding tool can be only optimized on a block level that is greater than or equal to the given block-level threshold, is removed when there is a mixture of Intra and Inter coded blocks for the current block.

4. Several tools may use signaling at the threshold level block. The various thresholds may be different and tool-specific. According to another alternative, one common threshold is used for all tools.

5. Blocks at the threshold level, where syntax signaling can be performed, may compose a picture frame without overlaps. For example, according to this implementation, it may not be possible to include other smaller blocks into more than one block with the threshold level size.

6. A block with the threshold size can be a virtual block, i.e. the block at which only certain syntax elements are grouped and signaled, or a real block, the block containing the full set of the information. Then, it is possible to have a case where a virtual block and a real block are the same one block. This scenario may occur, for example, when there are no further block splits and the real block with the size equal to the threshold is the final block. In this case, signaling, which should be done in the virtual block, is conditioned and postponed, and done in the real block instead. This implementation can provide a potential improvement in cases where syntax signaling is done only for certain prediction modes, however the prediction mode may not be available in the virtual block. In terms of performing aspects of this implementation, the signaling in the virtual block may be conditioned on the split flag and the block size equal to the threshold size. If there are no further splits and the block size is equal to the threshold, then the block is final and signaling can be done later, and only in the real block. The application of this conditional syntax signaling can be dependent on whether the combination of the blocks, which need to be differentiated, are possible at the virtual block size. For example, it can be dependent on slice type if the blocks are to be differentiated based on intra and inter prediction mode. In the case of an I-slice, inter prediction is not possible and the conditional signaling may not be needed. PDPC, described in further detail below, provides one or more examples. In a similar manner, a split flag can be inferred at the boundary. For example, when the block is large enough that the block crosses the picture boundary, the split flag may not be signaled and the (large) block is inferred to be split. The conditional signaling may be applied to the inferred split case as well.

7. In an example, the block level threshold may not correspond to an actual block in the decomposition. In such a case, if splitting a block results in two (BT) or four (QT) blocks below the block level threshold, then video encoder 22 may perform the syntax element signaling may be performed at this (sub-threshold) block size. A non-limiting example of such a block level threshold is 392 or any threshold that is not a power of 2.

8. In an example, video encoder 22 may signal the syntax element the very first time the block size is the same as or below the block level threshold. Once the syntax element is signaled for a block, it is not signaled for any further splits of that block.

In the description that follows, various examples of the above-listed techniques are provided. In accordance with this disclosure, any combination of any parts of the described embodiments may be implemented as a separate example.

Examples of optimizing and signaling EMT based on block area threshold: When EMT is applied for QTBT, a block level threshold may be pre-defined as 256. If the QTBT leaf node area is larger than the given threshold, both the EMT flag and the EMT index are signaled for this QTBT leaf node. If the current QTBT node area is identical to the given threshold (e.g., the leaf node is 16×16, 32×8, 8×32, 64×4, or 4×64), then no matter if it is further split into smaller blocks, one EMT flag is signaled for the current QTBT node. If this EMT flag is indicating enabling EMT, then an EMT index is further signaled for each of its leaf nodes. In this way, for a leaf node with area size smaller than the given threshold, only the EMT index is signaled, and the EMT flag is not signaled but derived from the one signaled from its closest parent node with area size equal to the given threshold.

In various examples, a default block level threshold may be applied for different video resolutions. For example, the default block level threshold can be set as 64 when a single video picture has smaller than 100,000 pixels, e.g., WQVGA (416×240), otherwise, the default block level threshold is set as 256, e.g., WVGA (832×480), 720p, 1080p or 4K.

Position Dependent Intra Prediction Combination (PDPC) Threshold: Following the example for EMT, PDPC may use a flag and/or PDPC indices. The flag and/or PDPC indices may be signaled for a block larger than or equal to the threshold size, and the values for the smaller blocks are inferred to be equal to the values signaled at the threshold level. For example, threshold level may be equal to 64 samples with respect to the luma component.

As mentioned above, the signaling of the PDPC flags and indices for a block with a size greater than or equal to the threshold size may be conditioned and not be performed, when the block is not split further. For such a case, the PDPC signaling is done at its original place, after the prediction mode is parsed and available. Since PDPC is an intra prediction-related tool, it is not applied for inter predicted blocks. If the syntax is not conditioned in this case, then the PDPC information is signaled once the block is equal to the threshold size. In this case, the block may not be further split and may be inter coded. In this case, PDPC information is not needed, but signaled and the bits associated with it are potentially wasted.

This implementation can be extended to cases of versions of PDPC that use more than one flag to signal prediction parameters (for instance, for the PDPC version that uses four sets of parameters, per block shape, and per prediction mode). Different thresholds on block size may define the number of flags that need to be further encoded, or alternatively, inherited and shared. This way, more PDPC parameter options may be available at the higher tree levels, where flag coding overhead is relatively small, and a smaller number of options (e.g., in some instances, a single option) are available when the relative overhead, per flag, increases.

Another extension is to use table-based rules for making the decisions about the signaling syntax, instead of using a single threshold. In this case, the table entries are the partition's width and height, and the table elements are lists with signaling syntax modifications valid for partitions derived from that partition shape.

Figure 6:
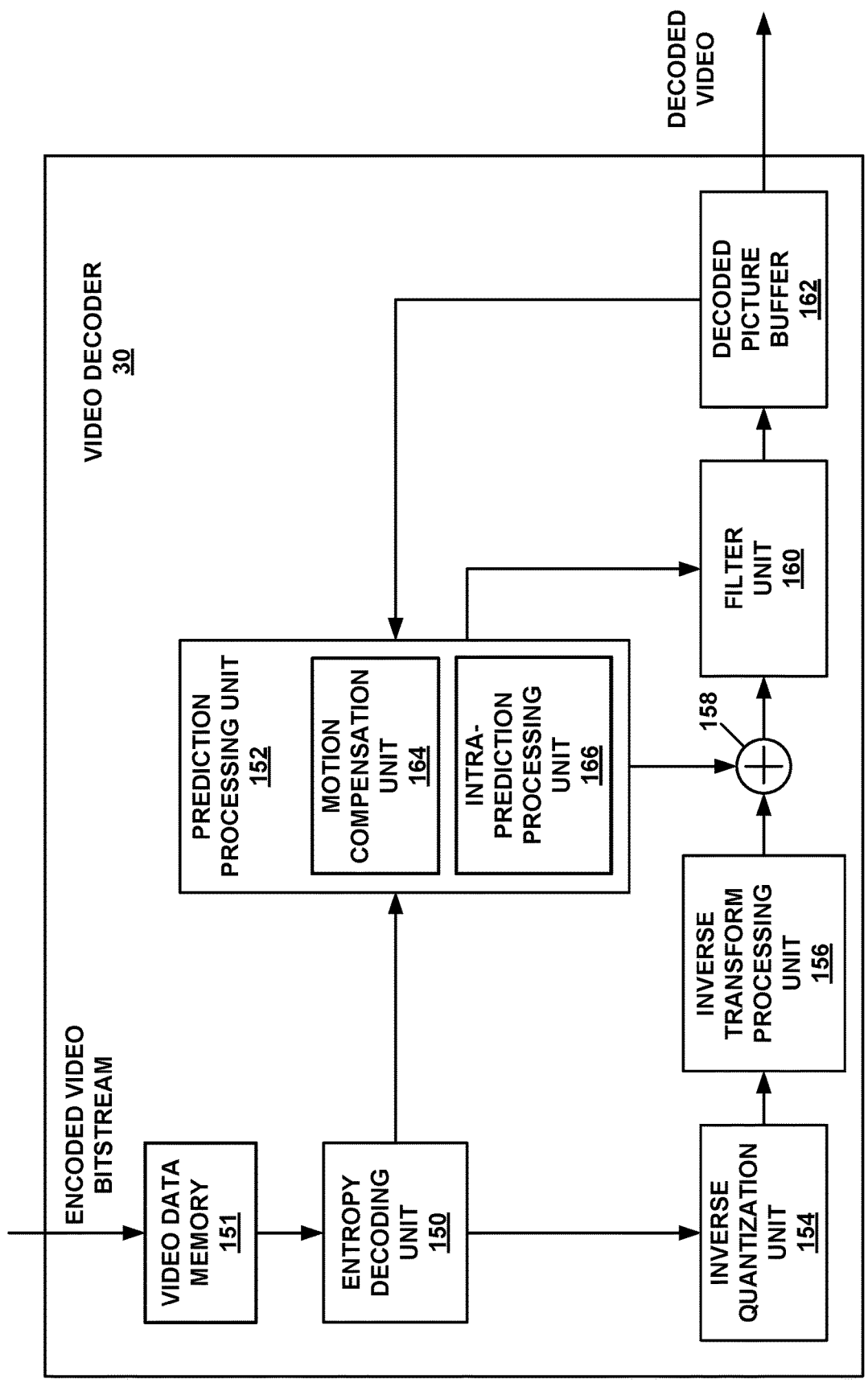
FIG. 6 is a block diagram illustrating an example of a video decoder configured to implement techniques of the disclosure.

FIG. 6 is a block diagram illustrating an example video decoder 30 that is configured to implement the techniques of this disclosure. FIG. 6 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 6, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In accordance with some examples of this disclosure, entropy decoding unit 150 may determine a tree structure as part of obtaining the syntax elements from the bitstream. The tree structure may specify how an initial video block, such as a CTB, is partitioned into smaller video blocks, such as coding units. In accordance with one or more techniques of this disclosure, for each respective non-leaf node of the tree structure at each depth level of the tree structure, there are a plurality of allowed splitting patterns for the respective non-leaf node and the video block corresponding to the respective non-leaf node is partitioned into video blocks corresponding to the child nodes of the respective non-leaf node according to one of the plurality of allowable splitting patterns.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

Video decoder 30 and/or one or more components thereof may be configured to implement various decoder-side techniques of this disclosure to mitigate or potentially resolve various problems discussed above, such as potential problems arising from existing coding tools being optimized for HEVC quadtree-based partitioning and not for the binary tree aspects of QTBT-based partitioning.

According to some techniques of this disclosure, video decoder 30 may define a block level threshold with respect to one or more coding tools, for scenarios in which a block splitting-based partitioning structure is applied for a block. As used herein, a "coding tool" is a specific coding method, technique, or mode that can be switched on or off at a certain block-level. This disclosure uses intra prediction, inter prediction, inter skip, transform signaling, enhanced multiple transform (EMT), non-separable secondary transform (NSST), or position-dependent prediction combination (PDPC) as illustrative examples of such coding tools at various instances, although it will be understood that video decoder 30 may also apply the techniques of this disclosure to the use of other coding tools, as well.

For instance, video decoder 30 may impose a constraint, such as a block-level threshold, when applying coding tools such as one or more of the above-listed coding tools to reconstruct encoded video data, regardless of whether a block to which the coding tool applies is to be partitioned according to the HEVC quadtree structure or the QTBT structure. Video decoder 30 may receive one or more syntax elements relevant to the coding tool to be applied to reconstruct a block that meets or exceeds the predetermined block-level threshold. In some examples, the threshold is different from the block size at which video decoder 30 applies the prediction and inverse transform.

In some implementations of the techniques of this disclosure, video decoder 30 may use a block-level threshold that is dependent upon the respective block's dimensions. As examples, the block-level threshold may be expressed in terms of one or more of block area size, or some combination of the block's width and height. For instance, video decoder 30 may use a block area-based threshold of 256 pixels with respect to the EMT coding tool. That is, video decoder 30 may apply EMT-based decoding to reconstruct blocks that cover at least 256 pixels in terms of area, and for which video decoder 30 receives an enabled EMT flag in the encoded video bitstream.

In this example, video decoder 30 may receive an EMT flag and one or more EMT indices such that the EMT flag applies on a block-wide basis for blocks that meet or exceed the 256 area threshold. That is, even if a 256-pixel block is further partitioned according to the HEVC quadtree structure or according to the QTBT structure, video decoder 30 may determine that the value of the EMT flag applies to all sub-blocks of the 256-pixel block. For instance, according to the QTBT partitioning structure, binary partitioning may become applicable only after a 256-pixel is further partitioned. That is, a 256-pixel block may have a square form factor, regardless of whether the block is split according to HEVC quadtree partitioning, or according to the QTBT partitioning structure.

Figure 7:
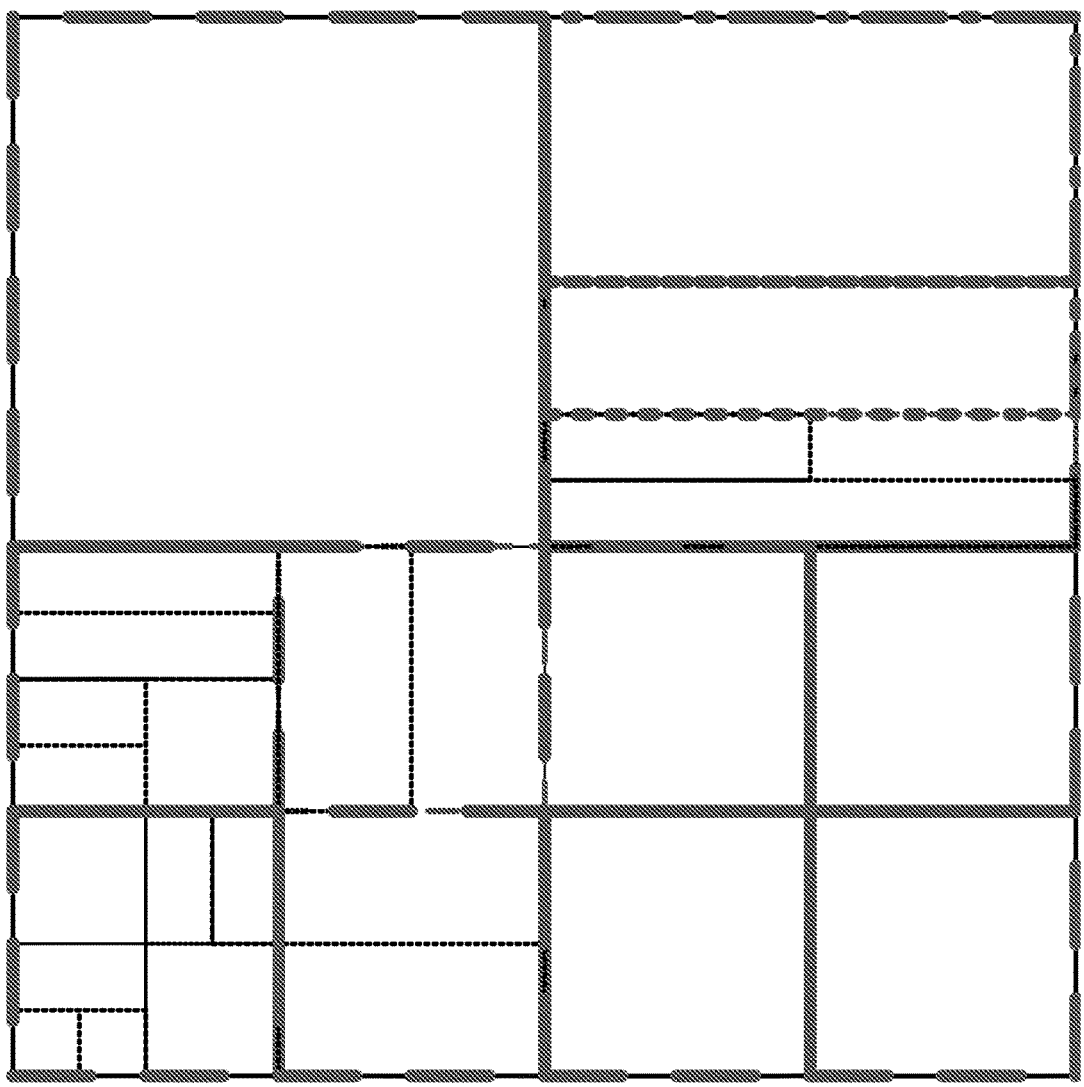
FIG. 7 is a conceptual diagram illustrating example coding tool-related flag signaling techniques of this disclosure for a 64×64 CTU.

FIG. 7 is a conceptual diagram illustrating example coding tool-related flag signaling techniques of this disclosure for a 64×64 CTU, which is illustrated as CTU 170. An example of the EMT flag-based techniques of this disclosure is illustrated for a 64×64 CTU in FIG. 7. According to the example illustrated in FIG. 7, video decoder 30 may only receive an EMT flag for each block which has an area larger than or equal to 256. Blocks that meet the threshold size of 256 are illustrated using thick, dashed-line borders. It will be appreciated that thick, solid-line borders appear along boundaries where two thick dashed-line borders overlap. For each sub-block with an area size smaller than 256 (which is identified with thin borders, either solid-lined or dotted-lined), video decoder 30 may not receive the EMT flag. Instead, video decoder 30 may infer the EMT flag value from the EMT flag of the smallest thick-line-bordered (threshold area-meeting) block that encloses or includes the current sub-block. In various examples, video decoder 30 may use other block-level threshold areas, such as, but are not limited to 32, 64, 128, 512, 1024, and so on.

In some examples of the block-level thresholding techniques with respect to coding tools, video decoder 30 may use a block-level threshold that is based on criteria other than block size dimensions. For instance, the block-level threshold may be based on one or more of a CTU, slice, tile, picture, or group of pictures (GOP) basis. That is, the block-level threshold may vary based on one or more of the above criteria.

Alternatively, in some implementations, the block-level threshold may vary based on a CTU, slice, tile, picture, or GOP basis, using information of a previously-coded CTU, slice, tile, picture or GOP, respectively. In some instances where the block-level threshold varies based on previously-coded information, the block level, for example, may be based on a count of how many times, for each block size, the prediction and/or inverse transform is performed. In some examples, the block-level threshold may be set to a default value. Examples of default values include, but are not limited to, the values of 64 or 256. In some examples, video decoder 30 may receive a block-level threshold value that is formed based on the slice type for the slice that includes the block, e.g., whether the slice is an intra slice, a P slice, or a B slice. While the block-level threshold may be a predefined fixed value, video decoder 30 may apply a different value for different coding configurations or image components. For instance, video decoder 30 may apply a different value for the block-level threshold depending on certain factors, such as whether the current slice is an intra slice, P slice, or B slice, and/or whether the current block represents a luma or chroma component.

In some examples, video decoder 30 may receive the block-level threshold out of band with respect to the block to which the threshold value applies. For example, video decoder 30 may receive the block-level threshold in one or more syntax structures such as a slice header, a picture parameter set (PPS), a video parameter set (VPS), or a sequence parameter set (SPS). Upon receiving the block-level threshold (e.g., whether in-band or out-of-band with respect to the applicable encoded block), video decoder 30 may use the block-level threshold as a condition for applying the decoder-side aspects of the respective coding tool(s) with respect to the encoded block.

In the implementation described above with respect to the block area-based threshold for application of EMT, video decoder 30 may apply any received EMT flag to a block that meets or exceeds the signaled block-level threshold area. For instance, if the block-level threshold area received (e.g., in a slice header, VPS, PPS, OR SPS) reflects an area of 256 pixels, then video decoder 30 may apply any received EMT flag to a block that is at least 256 pixels in area.

For instance, video decoder 30 may receive an EMT flag that is set to an enabled state (e.g., to a value of 1). Based on the enabled state of the EMT flag, video decoder 30 may activate the EMT coding tool with respect to the decoding of a block that covers at least 256 pixels in area, to which the EMT flag applies. That is, video decoder 30 may activate the EMT coding tool with respect to all sub-blocks of the block that is at least 256 pixels in area. In turn, video decoder 30 may receive an individual EMT index with respect to each sub-block of the block that is at least 256 pixels in area. Based on each received EMT index value, video decoder 30 may reconstruct each sub-block of the EMT-activated block using the EMT coding tool.

In this way, video decoder 30 may implement the block-level thresholding techniques of this disclosure to apply existing coding tools, without requiring any changes in the optimization of the coding tools to accommodate QTBT partitioning. Coding tool-based syntax elements, such as the EMT flag, are signaled at the CU level in accordance with the HEVC quadtree partitioning structure. An HEVC-compliant CU can vary size, but does not fall below an 8×8 dimensionality. However, the QTBT partitioning structure allows for an 8×8 block to be further partitioned, sometimes to the extent of being split into up to four sub-blocks. As such, extending the optimization of existing coding tools (e.g., EMT, PDPC, etc.) for the QTBT partitioning structure would cause a fourfold increase in flag coding. As such, video decoder 30 would be required to receive and process four flags for a ATBT-partitioned block, where video decoder 30 would have been required to receive and process a single flag for an HEVC quadtree-partitioned block.

As illustrated by the example of block area-based thresholding for the EMT flag, techniques of this disclosure enable video encoder 22 and video decoder 30 to continue to leverage HEVC-optimized coding tools (such as EMT) with respect to QTBT-partitioned blocks, without the fourfold increase in complexity and bandwidth consumption. That is, the block area-based thresholding techniques of this disclosure enable video encoder 22 and video decoder 30 to process a single flag for a square 256-pixel block, even if the block is partitioned according to the QTBT partitioning structure. In this way, the techniques of this disclosure enable video encoder 22 and video decoder 30 to use existing HEVC-optimized coding tools, while leveraging the more recent QTBT block partitioning structure. That is, the techniques of this disclosure enable the continued use of existing (HEVC optimized) coding tools without additional optimization for the QTBT partitioning structure.

According to some aspects of this disclosure, video decoder 30 may apply a block-level threshold to determine the lowest block-level at which only intra coding is applied, or at which only inter coding is applied for block reconstruction. For instance, video decoder 30 may determine the smallest block level at which only intra coding or inter coding is applied based on a size-based block-level threshold, or may receive smallest block level at which only intra coding or inter coding is applied as a value explicitly signaled in the encoded video bitstream. For instance, video decoder 30 may determine that no mixture of intra coding and inter coding is allowed at or below the block-level threshold. That is, video decoder 30 may apply only inter coding or only intra coding (but not a combination of both) to all sub-blocks of a block that has an area equal to or smaller than the threshold area, during the block reconstruction. Said another way, if a block is at or within the area threshold, then video decoder 30 may apply either intra coding to all sub-blocks, or may apply inter coding to reconstruct all encoded sub-blocks of the encoded block, regardless of the partitioning structure(s) used to form the sub-blocks from the block. While described with respect to the block area, it will be appreciated that the block-level threshold may, in some examples, be based on other size dimensions, such as block width and/or block height.

In some examples, the block-level threshold may vary according to one or more of a CTU basis, a slice basis, a tile basis, a picture basis, or a group of pictures (GOP) basis. Additionally, in various examples of video decoder 30 applying a block-level threshold for allowing or disallowing any mixture of intra and inter coding, video decoder 30 may receive the block-level threshold out of band with respect to the corresponding block, such as in a slice header, picture parameter set (PPS), video parameter set (VPS) or sequence parameter set (SPS).

Alternatively, the block-level threshold may be updated based on one or more of a CTU basis, a slice basis, a tile basis, a picture basis, or a GOP basis, using the coded information of a previously reconstructed CTU, slice, tile, picture or GOP, respectively. For instance, video decoder 30 may update the block-level threshold based on a count of how many times, for each block size, the prediction and/or inverse transform is performed. In some alternatives, video decoder 30 may set the block-level threshold to a default value, such as 64 or 256. In some examples, video decoder 30 may receive the block-level threshold as a value that is dependent on the slice type, e.g., whether the slice is an intra slice, P slice, or B slice.

In some implementations of the block-level thresholding for intra coding or inter coding determinations, the block-level threshold updating may be optional. For example, video decoder 30 may receive a "present" flag (which is an existing flag) to discern information related to the block-level threshold value. For instance, if the flag is set to a 0 value, video decoder 30 may determine that the block-level threshold is set to a default threshold level or default value. In cases of the block-level threshold being set to a default value, video decoder 30 may optionally receive the block-level threshold value at a higher structural level (such as in a PPS, SPS, or VPS). On the other hand, if the value of the present flag is set to a value of 1, video decoder 30 may determine that the block-level threshold value is or will be signaled directly.

If video decoder 30 does not receive the flag, video decoder 30 may infer the value of the flag to be 0. That is, in cases where the flag is not received with respect to a block, video decoder 30 may determine that the block-level threshold is set to a default value, and may therefore use the default value as the threshold block level with respect to applying the relevant coding tool(s) to the block. In some instances, video decoder 30 may receive an adjusted value, such that the signaled value excludes any case where the level is equal to the default value. In some instances, video decoder 30 may receive an adjusted block-level threshold value such that the signaling excludes any case where the level is equal to the default value.

In some examples, video decoder 30 may receive the block-level threshold as a value that is dependent on the slice type for the slice that includes the encoded block, e.g., whether the slice is an intra slice, a P slice, or a B slice. While the block-level threshold may be one of several pre-defined fixed values, video decoder 30 may apply a different value for different coding configurations or image components. For instance, video decoder 30 may apply a different value for the block-level threshold depending on certain factors, such as whether the current slice is an intra slice, a P slice, or a B slice, and/or whether the current encoded block represents a luma component or a chroma component.

In some instances, video decoder 30 may implement one or more exceptions to the choice between intra coding and inter coding for a block that is at or below the block-level threshold. That is, in some scenarios (which form exceptions to the block-level thresholding for intra-only or inter-only blocks), video decoder 30 may use both intra and inter coding to reconstruct encoded sub-blocks of a block that is at or below the block-level threshold. In some such scenarios, if video decoder 30 is configured to make exceptions to the inter-only or intra-only choice, video decoder 30 may receive a signaled flag for a block that is at or within the block-level threshold. Video decoder 30 may recover the flag's value to determine whether a mixture of intra and inter coding is allowed for the respective sub-blocks of the block. For instance, if the flag is set to a value of 0, video decoder 30 may determine that no mixture of intra coding and inter coding is allowed in the reconstruction of the corresponding block. On the other hand, if the flag is set to a value of 1, video decoder 30 may determine that a mixture of inter coding and intra coding is allowed with respect to the coding of the sub-blocks of the corresponding block. The flag that video decoder 30 may receive and recover to determine whether or not a mixture of intra coding and inter coding is permitted with respect to a block may represent a new flag, in that the flag represents an additional syntax element with respect to syntax elements specified in existing video coding standards such as H.264 and/or HEVC.

In some examples, video decoder 30 may implement the block-level constraint for the optimization of one or more coding tools, but may remove the constraint in cases where a threshold-meeting or threshold-exceeding block includes a mixture of intra coded and inter coded sub-blocks. For instance, some coding tools, such as PDPC and NSST, are optimized only for intra coding, according to HEVC. EMT is optimized for both inter coding and intra coding, and as such, can be implemented as EMT-inter and/or EMT-intra. Some coding tools are optimized only for inter coding according to HEVC. As such, the removal of the block-level constraint for coding optimization in the case of blocks that include both intra-coded and inter-coded sub-blocks is applicable to any such coding tools.

For instance, because the EMT coding tool is implemented as either EMT-intra or as EMT-inter for a given block, a block-level threshold may impede the use of the EMT coding tool in an instance where the block includes both intra-coded and inter-coded sub-blocks, because the EMT coding tools is applied as either EMT-intra or as EMT-inter. Similarly, the block-level constraint may impede the use of the PDPC tool or the NSST tool in instances where the block includes both intra-coded and inter-coded sub-blocks, because each of the PDPC tool and NSST tool is optimized for intra-coded blocks. In this way, video decoder 30 may implement block-level constraints for applying coding tools to accommodate the QTBT partitioning structure, but may remove the constraint in cases of blocks that include a mixture of inter-coded and intra-coded sub-blocks, to leverage the intra-only or inter-only optimization of the coding tools.

According to some techniques of this disclosure, video decoder 30 may receive information for one or more coding tools, where the signaling of the information is dependent on the block-level threshold. In one implementation, video decoder 30 may receive information for all coding tools that are applied by or available to video decoder 30, where the signaling of information for all such coding tools is dependent on a single block-level threshold. For instance, video decoder 30 may receive a single EMT flag, or a single PDPC flag, or a single NSST flag, only for a block that is at least at the threshold block-level. That is, in this implementation, the block-level threshold has a static value regardless of which coding tool that video decoder 30 uses to reconstruct the encoded block.

In another implementation of the block-level thresholding for coding tool signaling, the block-level threshold values may vary on a coding tool by coding tool basis. For instance, video decoder 30 may receive an EMT flag only for blocks that meet a first threshold level, a PDPC flag only for blocks that meet a second threshold level, and an NSST flag only for blocks that meet a third threshold level.

According to some examples of this disclosure, video decoder 30 may apply a unique block-level threshold for a single coding tool for reconstructing a single encoded block, at any given time. For instance, a block that meets or exceeds the block-level threshold (the threshold representing a minimum block level at which syntax signaling can be performed) may compose a picture frame without overlaps. For example, according to this implementation, video decoder 30 may not further partition any block if the partitioning would result in at least one sub-block that is smaller than the block-level threshold. That is, video decoder 30 may not include smaller sub-blocks in more than one block with the threshold level size.

Video decoder 30 may, in some scenarios, receive a so-called "virtual block" in the encoded video bitstream. More specifically, with respect to a virtual block, video decoder 30 may receive only a subset of the encoded data that forms the block. For instance, for a virtual block, video decoder 30 may receive a grouping of certain syntax elements with respect to the encoded video data of the block. In contrast to a virtual block, a "real block" represents an encoded block of video data for which video decoder 30 receives the full set of encoded information.

According to some techniques of this disclosure, if a virtual block qualifies as a real block (that is, that the virtual block and the corresponding real block are the same, single block), video decoder 30 may receive a postponed signaling of information that is customarily performed with respect to the virtual block. That is, video decoder 30 may receive the virtual block information with respect to the real block instead.

By receiving virtual block information with respect to a real block instead in certain scenarios, video decoder 30 may reduce the bitrate requirements imposed on video encoder 22 and the interconnecting data transport infrastructure in certain cases. For instance, in cases where syntax signaling is done only for certain prediction modes, if a real block is not further split, and the size of the real block is at least equal to the threshold size, then the real block may represent a final block. As such, the signaling of syntax elements that are customarily signaled as part of the virtual block may be performed subsequently (e.g., at video encoder 22), and video decoder 30 may receive these syntax elements purely with respect to the real block.

Video decoder 30 may receive the virtual block information subsequently with respect a real block, such that the signaled information is dependent on whether the combination of the resulting sub-blocks (which are distinguished from one another) are possible at the size of the virtual block. For example, video decoder 30 may receive or not receive the information with respect to the real block, such that the signaling is dependent on a slice type, if sub-blocks are differentiated based on having being encoded using intra prediction and inter prediction modes. In the case of an encoded block being included in an I-slice, inter prediction is not an option for the reconstruction of the encoded block. As such, in the case of the block being included in an I-slice, video encoder 22 may determine that the conditional signaling is not required.

An example of the conditional signaling techniques of this disclosure is described herein with respect to the PDPC coding tool. In some instances, video decoder 30 may infer split flag at a picture boundary, based on non-receipt of an explicitly signaled split flag at the boundary. In such cases, video decoder 30 may infer the block as being split at the picture boundary. That is, video decoder 30 may be configured to infer the block split at the picture boundary, based on the block crossing the picture boundary.

Upon receiving a PDPC flag set to the enabled state for the encoded block, video decoder 30 may infer that each and every sub-block of the threshold-sized block (regardless of the partitioning scheme(s) used to obtain the sub-blocks) is to be reconstructed using the PDPC coding tool. That is, video decoder 30 may infer PDPC flag values for the smaller sub-blocks to be equal to the single PDPC flag value received for the larger block that is at or in excess of the threshold level. In one example, video decoder 30 may use a threshold level equal to 64 samples for a luma component block that is to be encoded and decoded using the PDPC coding tool.

As described above, PDPC is a coding tool that is optimized for intra prediction mode. Therefore, video decoder 30 may not apply the PDPC coding tool for reconstruction of any inter-predicted encoded blocks or sub-blocks. In cases where video encoder 22 does not implement conditional signaling, video decoder 30 may receive the PDPC information for the encoded block that is equal to or larger than the threshold size, provided that that the encoded block is not further split and therefore does not include any inter-coded sub-blocks. Again, PDPC information may not be needed if the block includes inter-coded sub-blocks, and thus, signaling of sub-block-level PDPC information may cause bitrate wastage due to unnecessary bits being signaled. In this way, by reducing the instances in which PDPC information needs to be signaled explicitly, video decoder 30 may reduce bitrate requirements for PDPC coding tool application.

Video decoder 30 may also extend the conditional signaling-based reconstruction techniques of this disclosure to instances of recovering versions of PDPC that use more than one flag to determine prediction parameters. One such example is a PDPC version that utilizes four sets of parameters, per block shape, and per prediction mode. Video decoder 30 may implement different thresholds on block size to define the number of flags to be received and recovered, or alternatively, inherited and recovered. In this way, video decoder 30 may avail of a greater number of PDPC parameter options at higher tree levels, where flag recovery overhead may be relatively small. On the other hand, video decoder 30 may use a lesser number of PDPC parameter options (possibly as few as a single option) at lower tree levels, where the relative flag recovery overhead, at a per-flag level, is greater.

In some examples, video decoder 30 may, as an alternative to the block-level thresholding for coding tools as described above, instead implement a block-level threshold that does not correspond to an actual block in the block decomposition process. In these examples, if splitting a block results in two sub-blocks (BT-partitioning) or four sub-blocks (QT-partitioning) sub-blocks that are below the block-level threshold, then video decoder 30 may receive the coding tool-related syntax elements at the resulting sub-block size. An example of such a sub-block-based block-level threshold is 392, or any threshold size that is not a power of 2. In some instances, video decoder 30 may use a sub-block-based block-level threshold that is a floating point value.

According to some examples of this disclosure, video decoder 30 may receive a coding tool-related syntax element (e.g., the EMT flag) at the very first instance where video decoder 30 is able to detect that the block size is the same as or below the block-level threshold. Once the coding tool-related syntax element is signaled for a block, video decoder 30 may not receive the corresponding coding tool-related syntax element for any sub-blocks that result from further splits of the block. That is, according to these examples, video decoder 30 may receive the coding tool-related syntax element (e.g., the EMT flag) with respect to the first sub-block of a block, upon a partitioning juncture at which the resulting block is at or below the predetermined block-level threshold.

Figure 8:
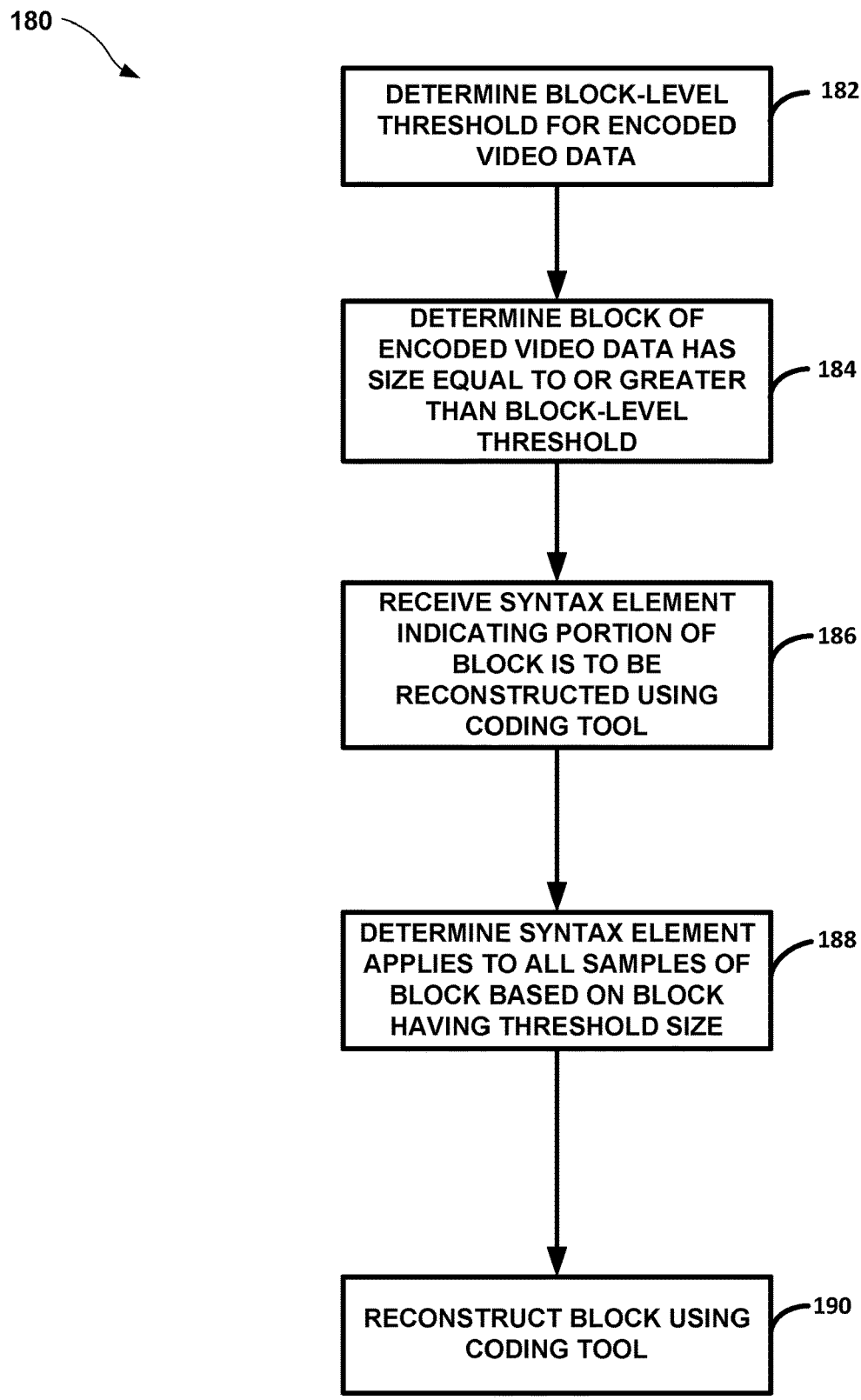
FIG. 8 is a flowchart illustrating an example process that a video decoding device may perform to implement one or more techniques of this disclosure.

FIG. 8 is a flowchart illustrating an example process 180 that video decoder 30 and/or various components thereof may perform to implement one or more techniques of this disclosure. Process 180 may begin when video decoder 30 determines a block-level threshold for encoded video data (182). For instance, video decoder 30 may determine the block-level threshold for a portion of encoded video data that is stored to one or more storage media of video decoder 30 or that are otherwise accessible to video decoder 30.

In turn, video decoder 30 may determine that an encoded block of the encoded video data has a size that is equal to or greater than the block-level threshold (184). In various examples, the block-level threshold is expressed in various size-based terms, such as a block area. Thus, video decoder 30 may determine that the area of the block is equal to or greater than the area represented by the block-level threshold value. Video decoder 30 may receive a syntax element indicating that a portion of the encoded block that meets the threshold is to be reconstructed using a coding tool (186). An example of the syntax element is the EMT flag, which indicates that at least a portion of the encoded block is to be reconstructed using the EMT coding tool.

Based on the encoded block having the size that is equal to or greater than the block-level threshold, video decoder 30 may determine that the received syntax element applies to all samples of the encoded block (188). That is, based on the encoded block having at least the threshold size, video decoder 30 may determine that the received syntax element applies to the entirety of the encoded block. In turn, video decoder 30 may reconstruct the encoded block using the coding tool (190).

In some examples, the block-level threshold represents a minimum area, and video decoder 30 may determine that the encoded block is partitioned into a plurality of sub-blocks according to one of a quadtree-based partitioning scheme or a quadtree plus binary tree-based partitioning scheme. In some examples, based on the encoded block having the size that is equal to or greater than the minimum area, video decoder 30 may determine that the received syntax element applies to each sub-block of the encoded block.

In some examples, the received syntax element comprises an enhanced multiple transform (EMT) flag, and video decoder 30 may determine that the EMT flag is set to an enabled state. Based on the EMT flag being set to the enabled state, video decoder 30 may decode a respective EMT index for each respective sub-block of the encoded block and reconstruct the encoded block using an EMT coding tool.

In some examples, the encoded block may be partitioned into a plurality of sub-blocks according to one of a quadtree-based partitioning scheme or a quadtree plus binary tree-based partitioning scheme, the block-level threshold may represent a maximum sub-block area, and the coding tool may include at least one of intra coding or inter coding. Video decoder 30 may determine, based on any of the one or more sub-blocks being smaller than the maximum sub-block area, that the sub-block is to be reconstructed using only one of intra coding or intra coding. In some examples, video decoder 30 may apply the block-level threshold to each respective coding tool of a plurality of coding tools that includes the coding tool for which the syntax element is received. The plurality of coding tools may include two or more of an enhanced multiple transform (EMT) coding tool, a position-dependent prediction combination (PDPC) coding tool, a non-separable secondary transform (NSST) coding tool, an intra prediction tool, or an inter prediction tool. In various examples, the intra prediction tool may be referred to as an intra coding tool, or an intra prediction coding tool. In various examples, the inter prediction tool may be referred to as an inter coding tool, or an inter prediction coding tool In some examples, the block-level threshold is included in a plurality of block-level thresholds, and video decoder 30 may apply a respective block-level threshold of the plurality of block-level thresholds to each respective coding tool of a plurality of coding tools that includes the coding tool for which the syntax element is received.

Figure 9:
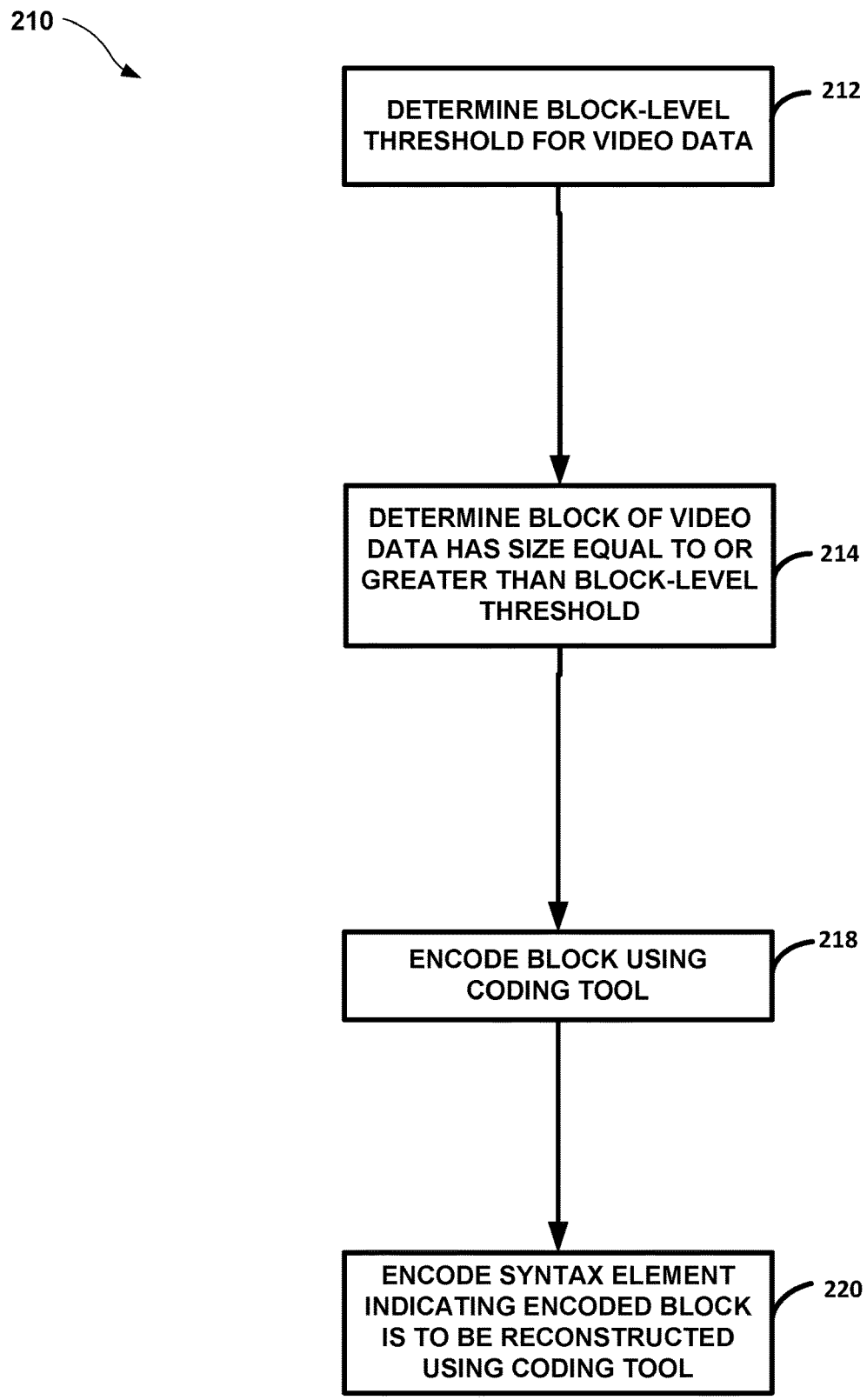
FIG. 9 is a flowchart illustrating an example process that a video encoding device may perform to implement one or more techniques of this disclosure.

FIG. 9 is a flowchart illustrating an example process 210 that video encoder 22 and/or various components thereof may perform to implement one or more techniques of this disclosure. Process 210 may begin when video encoder 22 determines a block-level threshold for video data (212). For instance, video encoder 22 may determine the block-level threshold for a portion of video data that is stored to one or more storage media of video encoder 22 or that are otherwise accessible to video encoder 22.

In turn, video encoder 22 may determine that a block of the video data has a size that is equal to or greater than the block-level threshold (214). In various examples, the block-level threshold is expressed in various size-based terms, such as a block area. Thus, video encoder 22 may determine that the area of the block is equal to or greater than the area represented by the block-level threshold value.

Video encoder 22 may encode the block using a coding tool (218). Examples of such coding tools include the EMT coding tool, the PDPC coding tool, the NSST coding tool, inter coding, or intra coding. Based on the block having the size that is equal to or greater than the block-level threshold, video encoder 22 may encode a syntax element that indicates that all samples of the threshold-meeting encoded block are to be reconstructed using the coding tool to form an encoded block (220). That is, based on the encoded block having at least the threshold size, video encoder 22 may encode the syntax element such that the syntax element applies to the entirety of the encoded block. In one such example, video encoder 22 may encode an EMT flag in an enabled state for the entire encoded block.

In some examples, the block-level threshold represents a minimum sub-block area, and video encoder 22 may partition the encoded block into a plurality of sub-blocks according to one of a quadtree-based partitioning scheme or a quadtree plus binary tree-based partitioning scheme. In some examples, video encoder 22 may determine, based on the encoded block having the size that is equal to or greater than the minimum sub-block area, that the encoded syntax element applies to each sub-block of the encoded block. In some examples, the encoded syntax element comprises an enhanced multiple transform (EMT) flag, and video encoder 22 may set the EMT flag to an enabled state. In some of these examples, video encoder 22 may encode a respective EMT index for each respective sub-block of the encoded block.

In some examples, the encoded block is partitioned into a plurality of sub-blocks according to one of a quadtree-based partitioning scheme or a quadtree plus binary tree-based partitioning scheme, the block-level threshold represents a maximum sub-block area, and the coding tool is at least one of intra coding or inter coding. In these examples, video encoder 22 may, based on any respective sub-block of the one or more sub-blocks being smaller than the maximum sub-block area, encode the respective sub-block using only one of intra coding or intra coding. In some examples, video encoder 22 may apply the block-level threshold to each respective coding tool of a plurality of coding tools that includes the coding tool for which the syntax element is encoded.

In some examples, the plurality of coding tools includes two or more of an enhanced multiple transform (EMT) coding tool, a position-dependent prediction combination (PDPC) coding tool, a non-separable secondary transform (NSST) coding tool, an intra the intra prediction tool may be referred to as an intra coding tool, or an intra prediction tool, or an inter prediction tool. In some examples, the block-level threshold is included in a plurality of block-level thresholds, and video encoder 22 may apply a respective block-level threshold of the plurality of block-level thresholds to each respective coding tool of a plurality of coding tools that includes the coding tool for which the syntax element is encoded.

In some examples, the encoded block comprises a real block of the portion of the encoded video data stored to the storage media, and video encoder 22 may determine that a virtual block that corresponds to the real block meets the block-level threshold. In these examples, video encoder 22 may, based on the virtual block meeting the block-level threshold, signal the encoded syntax element with respect to the real block instead of signaling the encoded syntax element with respect to the virtual block that corresponds to the real block.

In some examples, video encoder 22 may signal the encoded syntax element in one of a picture parameter set (PPS), a sequence parameter set (SPS), or a video parameter set (VPS) of an encoded video bitstream. In some examples, video encoder 22 may determine the block-level threshold based on one or more of an area of the encoded block, a width of the encoded block, or a height of the encoded block. In some examples, video encoder 22 may determine whether to apply the coding tool in encoding the block at least in part by performing a bitrate optimization with respect to the coding tool and a portion of the block. In some examples, video encoder 22 may avoid signaling syntax elements indicating the coding tool used to reconstruct individual samples of the encoded block.

Certain aspects of this disclosure have been described with respect to the HEVC standard, extensions of the HEVC standard for purposes of illustration, or to the in-development next-generation video coding standards. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, processing circuitry (e.g., programmable processing circuitry, fixed function circuitry, or a combination of programmable processing circuitry and fixed function circuitry), application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding encoded video data, the device comprising:
   storage media configured to store at least a portion of the encoded video data; and
   processing circuitry in communication with the storage media, the processing circuitry being configured to:
   determine a block-level threshold for the portion of the encoded video data stored to the storage media;
   determine that an encoded block of the portion of the encoded video data stored to the storage media has a size that is equal to or greater than the block-level threshold;
   determine that the encoded block is partitioned into a plurality of sub-blocks according to one of a quadtree-based partitioning scheme or a quadtree plus binary tree-based partitioning scheme;
   receive a syntax element indicating that a first sub-block of the plurality of sub-blocks of the encoded block is to be reconstructed using a coding tool;
   based on the encoded block having the size that is equal to or greater than the block-level threshold, determine that the syntax element applies to all samples of a plurality of samples included in all sub-blocks of the plurality of sub-blocks of the encoded block; and
   reconstruct all samples of the plurality of samples included in all sub-blocks of the plurality of sub-blocks of the encoded block using the coding tool.

2. The device of claim 1, wherein the block-level threshold represents a minimum area.

3. The device of claim 1, wherein the received syntax element comprises an enhanced multiple transform (EMT) flag, the processing circuitry being further configured to:
   determine that the EMT flag is set to an enabled state; and
   based on the EMT flag being set to the enabled state, decode a respective EMT index for each respective sub-block of the plurality of sub-blocks of the encoded block,
   wherein to reconstruct all samples of the plurality of samples included in all sub-blocks of the plurality of sub-blocks of the encoded block, the processing circuitry is configured to reconstruct all samples of the plurality of samples included in all sub-blocks of the plurality of sub-blocks of the encoded block using an EMT coding tool.

4. The device of claim 1, the block-level threshold representing a maximum sub-block area, the coding tool comprising at least one of intra prediction or inter coding, and the processing circuitry being further configured to:
   determine, based on the first sub-block of the plurality of sub-blocks being smaller than the maximum sub-block area, that the first sub-block is to be reconstructed using only one of intra prediction or inter prediction.

5. The device of claim 1, the processing circuitry being further configured to apply the block-level threshold to each respective coding tool of a plurality of coding tools that includes the coding tool for which the syntax element is received.

6. The device of claim 5, wherein the plurality of coding tools includes two or more of an enhanced multiple transform (EMT) coding tool, a position-dependent prediction combination (PDPC) coding tool, a non-separable secondary transform (NSST) coding tool, an intra prediction tool, or an inter prediction tool.

7. The device of claim 1, wherein the block-level threshold is included in a plurality of block-level thresholds, and wherein the processing circuitry is further configured to apply a respective block-level threshold of the plurality of block-level thresholds to each respective coding tool of a plurality of coding tools that includes the coding tool for which the syntax element is received.

8. The device of claim 1, wherein the encoded block comprises a real block of the portion of the encoded video data stored to the storage media, the processing circuitry being further configured to:

receive the syntax element with respect to the real block instead of receiving the syntax element with respect to a virtual block that corresponds to the real block.

9. The device of claim 1, wherein to determine the block-level threshold, the processing circuitry is configured to receive data indicating the block-level threshold in one of a picture parameter set (PPS), a sequence parameter set (SPS), or a video parameter set (VPS) of an encoded video bitstream.

10. A device for encoding video data, the method comprising:
    storage media configured to store at least a portion of the video data; and
    processing circuitry in communication with the storage media, the processing circuitry being configured to:
        determine a block-level threshold for the portion of the video data stored to the storage media;
        determine that a block of the portion of the video data stored to the storage media has a size that is equal to or greater than the block-level threshold;
        partition the encoded block into a plurality of sub-blocks according to one of a quadtree-based partitioning scheme or a quadtree plus binary tree-based partitioning scheme:
        encode all samples of a first sub-block of the plurality of sub-blocks partitioned from the block using a coding tool;
        based on the encoded block having the size that is equal to or greater than the block-level threshold, encode all samples of a plurality of samples included in all sub-blocks of the plurality of sub-blocks partitioned from the block using the coding tool, to form an encoded block; and
        based on the encoded block having the size that is equal to or greater than the block-level threshold, encode a syntax element indicating that all samples of the plurality of samples included in all sub-blocks of the plurality of sub-blocks partitioned from the encoded block are to be reconstructed using the coding tool.

11. The device of claim 10, wherein the block-level threshold represents a minimum sub-block area.

12. The device of claim 10, wherein the encoded syntax element comprises an enhanced multiple transform (EMT) flag, the processing circuitry being further configured to:
    set the EMT flag to an enabled state; and
    encode a respective EMT index for each respective sub-block of the plurality of sub-blocks of the encoded block.

13. The device of claim 10, the block-level threshold representing a maximum sub-block area, the coding tool comprising at least one of intra coding or inter coding, and the processing circuitry being further configured to:
    based on the first sub-block of the one or more sub-blocks being smaller than the maximum sub-block area, encode the first sub-block using only one of intra coding or inter coding.

14. The device of claim 10, the processing circuitry being further configured to apply the block-level threshold to each respective coding tool of a plurality of coding tools that includes the coding tool for which the syntax element is encoded.

15. The device of claim 14, wherein the plurality of coding tools includes two or more of an enhanced multiple transform (EMT) coding tool, a position-dependent prediction combination (PDPC) coding tool, a non-separable secondary transform (NSST) coding tool, an intra prediction tool, or an inter prediction tool.

16. The device of claim 10, wherein the block-level threshold is included in a plurality of block-level thresholds, and wherein the processing circuitry is further configured to apply a respective block-level threshold of the plurality of block-level thresholds to each respective coding tool of a plurality of coding tools that includes the coding tool for which the syntax element is encoded.

17. The device of claim 10, wherein the encoded block comprises a real block of the portion of the video data stored to the storage media, the processing circuitry being further configured to:
    determine that a virtual block that corresponds to the real block meets the block-level threshold; and
    based on the virtual block meeting the block-level threshold, signal the encoded syntax element with respect to the real block instead of signaling the encoded syntax element with respect to the virtual block that corresponds to the real block.

18. The device of claim 10, the processing circuitry being further configured to signal data indicative of the block-level threshold in one of a picture parameter set (PPS), a sequence parameter set (SPS), or a video parameter set (VPS) of an encoded video bitstream.

19. The device of claim 10, the processing circuitry being further configured to determine the block-level threshold based on one or more of an area of the block, a width of the block, or a height of the block.

20. The device of claim 10, the processing circuitry being further configured to determine whether to apply the coding tool in encoding the block at least in part by performing a bitrate optimization with respect to the coding tool and the first sub-block.

21. The device of claim 10, the processing circuitry being further configured to omit, from an encoded video bitstream to be signaled via an interface of the device, syntax elements indicating the coding tool used to reconstruct individual samples of the encoded block.

22. A method of decoding encoded video data, the method comprising:
    determining a block-level threshold for a portion of the encoded video data;
    determining that an encoded block of the portion of the encoded video data has a size that is equal to or greater than the block-level threshold;
    determining that the encoded block is partitioned into a plurality of sub-blocks according to one of a quadtree-based partitioning scheme or a quadtree plus binary tree-based partitioning scheme;
    receiving a syntax element indicating that a first sub-block of the plurality of sub-blocks of the encoded block is to be reconstructed using a coding tool;
    based on the encoded block having the size that is equal to or greater than the block-level threshold, determining that the syntax element applies to all samples of a plurality of samples included in all sub-blocks of the plurality of sub-blocks of the encoded block; and
    reconstructing all samples of the plurality of samples included in all sub-blocks of the plurality of sub-blocks of the encoded block using the coding tool.

23. The method of claim 22, wherein the block-level threshold represents a minimum area.

24. The method of claim 22, wherein the received syntax element comprises an enhanced multiple transform (EMT) flag, the method further comprising:
    determining that the EMT flag is set to an enabled state; and based on the EMT flag being set to the enabled state, decoding a respective EMT index for each respective sub-block of the plurality of sub-blocks of the encoded block, wherein reconstructing all samples of the plurality of samples included in all sub-blocks of the plurality of sub-blocks of the encoded block comprises reconstructing all samples of the plurality of samples included in all sub-blocks of the plurality of sub-blocks of using an EMT coding tool.

25. The method of claim 22, the block-level threshold representing a maximum sub-block area, the coding tool comprising at least one of intra prediction or inter prediction, the method further comprising:

determining, based on the first sub-block of the plurality of sub-blocks being smaller than the maximum sub-block area, that the first sub-block is to be reconstructed using only one of intra prediction or inter prediction.

26. The method of claim 22, further comprising applying the block-level threshold to each respective coding tool of a plurality of coding tools that includes the coding tool for which the syntax element is received.

27. The method of claim 26, wherein the plurality of coding tools includes two or more of an enhanced multiple transform (EMT) coding tool, a position-dependent prediction combination (PDPC) coding tool, a non-separable secondary transform (NSST) coding tool, an intra prediction tool, or an inter prediction tool.

28. The method of claim 22, the block-level threshold being included in a plurality of block-level thresholds, the method further comprising applying a respective block-level threshold of the plurality of block-level thresholds to each respective coding tool of a plurality of coding tools that includes the coding tool for which the syntax element is received.

29. The method of claim 22, wherein the encoded block comprises a real block of the portion of the encoded video data stored to the storage media, the method further comprising:

receiving the syntax element with respect to the real block instead of receiving the syntax element with respect to a virtual block that corresponds to the real block.

30. An apparatus for decoding encoded video data, the apparatus comprising:

means for determining a block-level threshold for a portion of the encoded video data;

means for determining that an encoded block of the portion of the encoded video data stored to the storage media has a size that is equal to or greater than the block-level threshold;

means for determining that the encoded block is partitioned into a plurality of sub-blocks according to one of a quadtree-based partitioning scheme or a quadtree plus binary tree-based partitioning scheme;

means for receiving a syntax element indicating that a first sub-block of the plurality of sub-blocks of encoded block is to be reconstructed using a coding tool;

means for determining, based on the encoded block having the size that is equal to or greater than the block-level threshold, that the syntax element applies to all samples of a plurality of samples included in all sub-blocks of the plurality of sub-blocks of the encoded block; and means for reconstructing all samples of the plurality of samples included in all sub-blocks of the plurality of sub-blocks of the encoded block using the coding tool.

* * * * *